(12) United States Patent
Yeh et al.

(10) Patent No.: US 11,131,340 B2
(45) Date of Patent: Sep. 28, 2021

(54) LINEAR GUIDEWAY WITH EMBEDDED SENSOR

(71) Applicant: Industrial Technology Research Institute, Hsinchu (TW)

(72) Inventors: Chien-Nan Yeh, Tainan (TW); Chung-Yuan Su, Tainan (TW); Chao-Ta Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 20 days.

(21) Appl. No.: 16/870,439

(22) Filed: May 8, 2020

(65) Prior Publication Data
US 2021/0018041 A1 Jan. 21, 2021

(30) Foreign Application Priority Data

Jul. 19, 2019 (TW) .................................. 108125712

(51) Int. Cl.
*F16C 29/06* (2006.01)
*F16C 41/00* (2006.01)
*G01B 7/16* (2006.01)

(52) U.S. Cl.
CPC .......... *F16C 29/0602* (2013.01); *F16C 41/00* (2013.01); *G01B 7/18* (2013.01); *F16C 2233/00* (2013.01)

(58) Field of Classification Search
CPC .. F16C 29/06; F16C 29/0602; F16C 29/0604; F16C 29/0633; F16C 29/0635;
(Continued)

(56) References Cited

U.S. PATENT DOCUMENTS 7,178,981 B2    2/2007  Rudy et al.
9,933,013 B2 *  4/2018  Jaynes ..................... G01L 5/00
                        (Continued)

FOREIGN PATENT DOCUMENTS

CN      108884876 A      11/2018
DE   102017201230 A1 *   7/2018  ............... G01B 7/16
                        (Continued)

OTHER PUBLICATIONS

Liang, Yi, et al. "Modeling and Error Analysis of the Parallelism Measurement for Linear Rolling Guide Pair," International Journal of Materials, Mechanics and Manufacturing, Feb. 2016, pp. 60-65, vol. 4, No. 1, US.

(Continued)

*Primary Examiner* — Phillip A Johnson

(57) ABSTRACT

A linear guideway with an embedded sensor includes a track, a slider, a plurality of rolling members, and a sensing module. The track extends in a first direction and has a first recess. The slider can move in the first direction and include a second recess, a channel, at least one hole, and a deforming region. The channel is formed by coupling the first recess and the second recess, and extends in the first direction. The hole extends from the surface of the slider along the insertion axis and into the slider. The rolling members are disposed in the channel. The sensing module is disposed in the hole, and contacts the deforming region to detect the amount of deformation.

27 Claims, 23 Drawing Sheets

(58) Field of Classification Search
CPC .............. F16C 29/0638; F16C 29/0652; F16C 29/0654; F16C 29/0671; F16C 41/00; F16C 2233/00; G01B 7/18
See application file for complete search history.

(56) References Cited

U.S. PATENT DOCUMENTS

| | | | |
|---|---|---|---|
| 10,436,254 B1* | 10/2019 | Lin | ..................... F16C 29/0647 |
| 10,520,023 B2* | 12/2019 | Ziegler | ................. F16C 29/002 |
| 2006/0013515 A1 | 1/2006 | Rudy et al. | |
| 2007/0098309 A1 | 5/2007 | Rudy et al. | |
| 2007/0237435 A1 | 10/2007 | Nagao et al. | |
| 2017/0292900 A1 | 10/2017 | Kuo et al. | |
| 2018/0321194 A1 | 11/2018 | Cheng et al. | |
| 2020/0232513 A1* | 7/2020 | Janssen | ................... F16C 29/12 |

FOREIGN PATENT DOCUMENTS

| | | | | |
|---|---|---|---|---|
| JP | 2003097552 A | * | 4/2003 | .............. F16C 29/06 |
| TW | I539093 B | | 6/2016 | |
| TW | I578134 B | | 4/2017 | |
| TW | 201723330 A | | 7/2017 | |
| TW | I664365 B | | 7/2019 | |
| TW | I669457 B | | 8/2019 | |
| WO | WO2018092498 A1 | | 5/2018 | |

OTHER PUBLICATIONS

Sun, Wei, et al. "Statics modeling and analysis of linear rolling guideway considering rolling balls contact," Journal of Mechanical Engineering Science, 2014. pp. 1-12, IMechE, US.
Ohta, Hiroyuki and Eiji Hayashi. "Vibration of Linear Guideway Type Recirculating Linear Ball Bearings" Journal of Sound and Vibration, 2000, pp. 847-861, Academic Press, US.

* cited by examiner

LINEAR GUIDEWAY WITH EMBEDDED SENSOR

CROSS REFERENCE TO RELATED APPLICATIONS

The present application is based on, and claims priority from, Taiwan Patent Application No. 108125712, filed Jul. 19, 2019, the disclosure of which is hereby incorporated by reference herein in its entirety.

BACKGROUND

Field of the Disclosure

The application relates to a linear guideway, and in particular, to a linear guideway with an embedded sensor.

Description of the Related Art

A linear guideway is an important component in an automatic machine, and they are widely used in machine tools, semiconductor equipment, smart automatic machines, medical equipment, robots, and other applications. Linear guideways primarily include a track, a slider, and a plurality of balls. The balls are arranged between the track and the slider, and the slider can move on the track via the balls.

However, when the slider is continuously moving on the track for a long period of time, the balls can wear out, and the slider can no longer move smoothly and accurately on the track. Therefore, how to detect the wear of the balls so that the user can replace worn balls in time has become an important issue related to linear guideways.

SUMMARY

An embodiment in accordance with the disclosure provides a linear guideway. The linear guideway includes a track, a slider, a plurality of rolling members, and a sensing module. The track extends in a first direction and has a first recess. The slider can move in the first direction and includes a second recess, a channel, at least one hole, and a deforming region. The channel is formed by coupling the first recess and the second recess, and extends in the first direction. The hole extends from the surface of the slider along the insertion axis and into the slider. The rolling members are disposed in the channel. The sensing module is disposed in the hole, and contacts the deforming region to detect the amount of deformation.

In some embodiments, the insertion axis corresponding to the hole is perpendicular to the first direction. The surface from which the at least one hole extends is an upper surface, a lower surface, or an outer lateral surface of the slider.

In some embodiments, the distance from the insertion axis to the channel is less than the distance from the insertion axis to an outer lateral surface of the slider. The sensing module comprises an elastic member. The elastic member becomes deformed when a force is applied to the elastic member, and the deforming direction of the elastic member is perpendicular to the insertion axis of the hole.

In some embodiments, the slider further comprises at least one inner bottom surface at one end of the hole. The inner bottom surface of the slider has a centroid. The distance from the centroid to the channel is less than the distance from the centroid to the surface. The deforming direction of the elastic member is parallel with the insertion axis of the hole.

In some embodiments, the insertion axis of the hole is parallel with the first direction. The surface from which the at least one hole extends is a cross-section of the slider. The distance from the insertion axis to the channel is less than the distance from the insertion axis to an outer lateral surface of the slider. The deforming direction of the elastic member is parallel with the insertion axis of the hole.

In some embodiments, the sensing module further comprises a temperature sensor to detect the temperature.

An embodiment in accordance with the disclosure provides a linear guideway. The linear guideway includes a track, a slider, a plurality of rolling members, and a sensing module. The track extends in a first direction and has at least one first recess, at least one hole, and a deforming region. The hole extends from the surface of the track along the insertion axis into the track. The slider can move in the first direction and include at least one second recess and a channel. The channel is formed by coupling the first recess and the second recess, and extends in the first direction. The deforming region is disposed between the hole and the channel. The rolling members are disposed in the channel. The sensing module is disposed in the hole, and contacts the deforming region to detect the amount of deformation.

In some embodiments, the insertion axis of the hole is perpendicular to the first direction. The surface from which the at least one hole extends is the upper surface, the lower surface, or the outer lateral surface of the track. In some embodiments, the track has a central cross-section. The track can be equally divided into two parts by the central cross-section, and the distance from the insertion axis to the channel is less than the distance from the insertion axis to the central cross-section.

In some embodiments, the surface from which the at least one hole extends is a lower surface of the track, the track further comprises at least one inner bottom surface at one end of the hole, the inner bottom surface of the track has a centroid, and the distance from the centroid to the channel is less than the distance from the centroid to the lower surface.

In some embodiments, the sensing module comprises an elastic member, wherein the elastic member becomes deformed when a force is applied to the elastic member, and the deforming direction of the elastic member is perpendicular to the insertion axis of the hole. In some embodiments, the deforming direction of the elastic member is parallel with the insertion axis of the hole.

In some embodiments, the surface from which the at least one hole extends is an outer lateral surface of the track, the track further comprises at least one inner bottom surface at one end of the hole, the inner bottom surface of the track has a centroid. The track has a central cross-section. The track can be equally divided into two parts by the central cross-section, and the centroid is disposed on the central cross-section.

In some embodiments, the sensing module further comprises a temperature sensor to detect the temperature.

DETAILED DESCRIPTION

A linear guideway in the disclosure can use a sensing module to detect the amount of deformation of a slider or a track, and obtain the wear rate of the balls.

Figure 1:
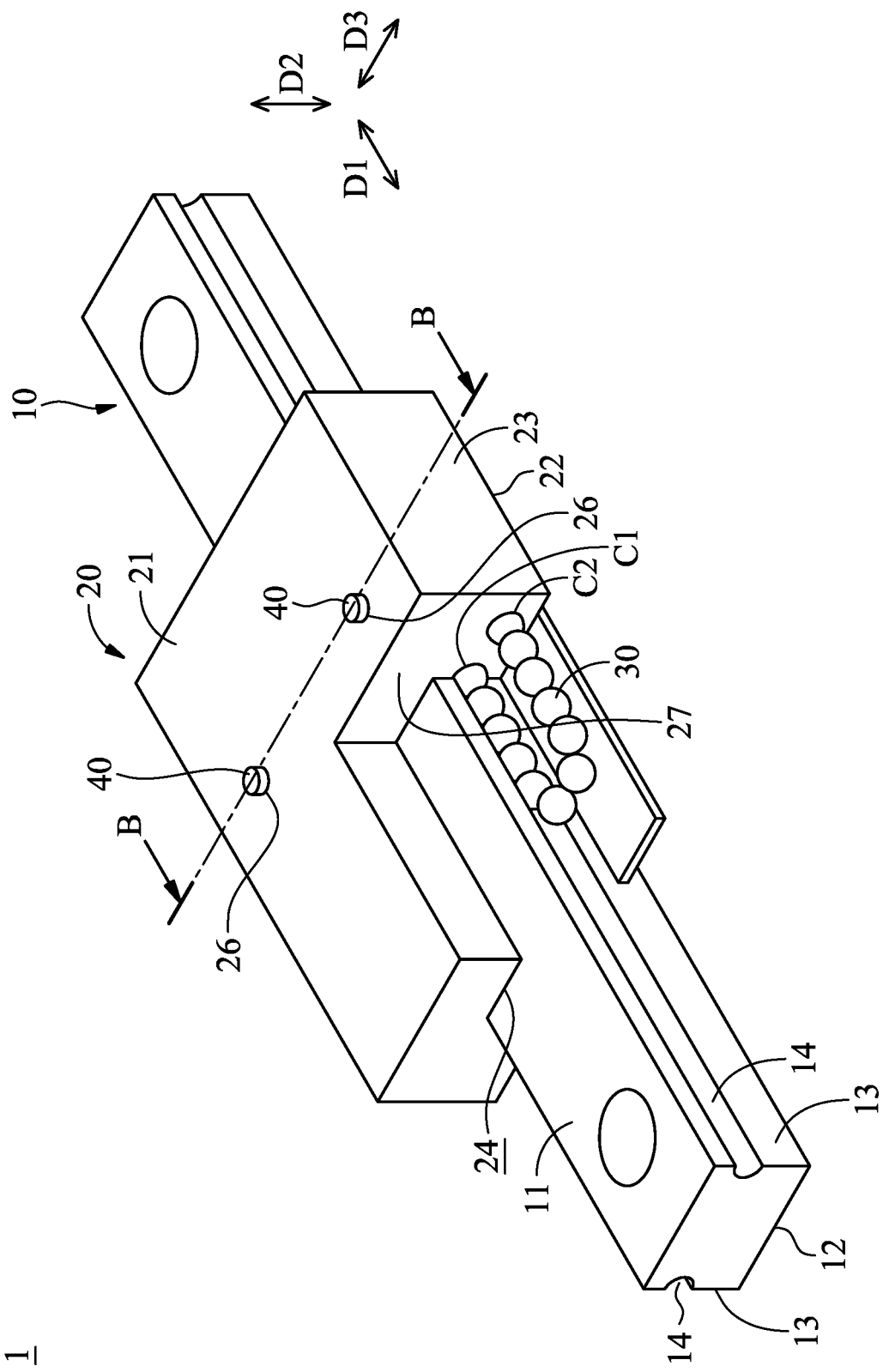
FIG. 1 is a schematic diagram of a linear guideway according to some embodiments of the disclosure.

FIG. 1 is a schematic diagram of a linear guideway 1 according to some embodiments of the disclosure. The linear guideway 1 includes a track 10, a slider 20, a plurality of rolling members 30, and a plurality of sensing modules 40. The track 10 extends in a first direction D1. The track 10 can be made of a metal such as steel.

The track 10 includes an upper surface 11, a lower surface 12, two outer lateral surfaces 13, and two first recesses 14. The upper surface 11, the lower surface 12, the outer lateral surfaces 13 and the first recesses 14 extend in the first direction D1. The upper surface 11 is parallel with the lower surface 12, and the upper surface 11 and the lower surface 12 are respectively disposed on the opposite sides of the track 10. The outer lateral surfaces 13 are connected to the upper surface 11 and the lower surface 12, and perpendicular to the upper surface 11 and the lower surface 12. In some embodiments, the outer lateral surfaces 13 are inclined with respect to the upper surface 11 and/or the lower surface 12. Two first recesses 14 are respectively formed on the two outer lateral surfaces 13.

Figure 2:
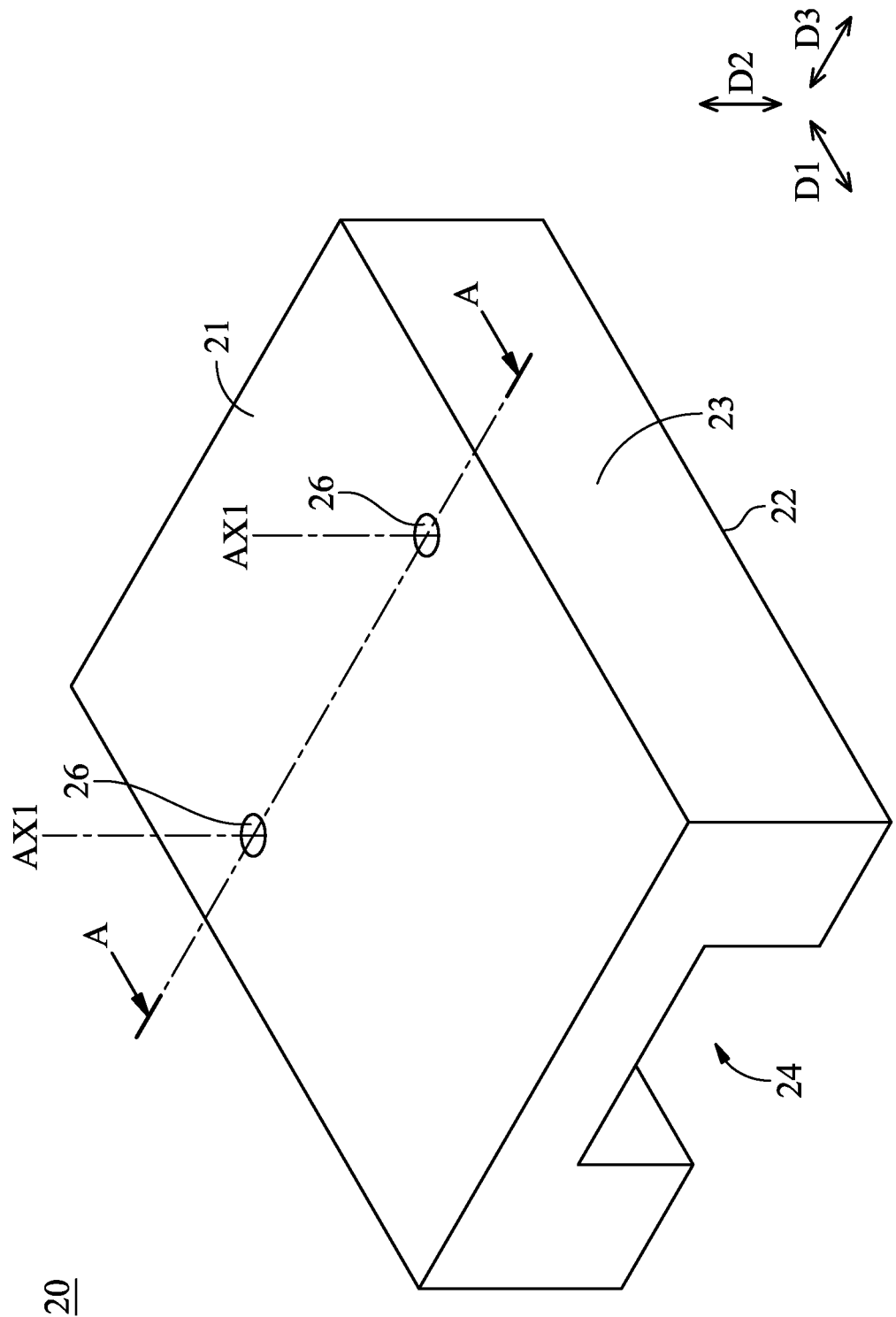
FIG. 2 is a schematic diagram of a slider according to some embodiments of the disclosure.
Figure 3:
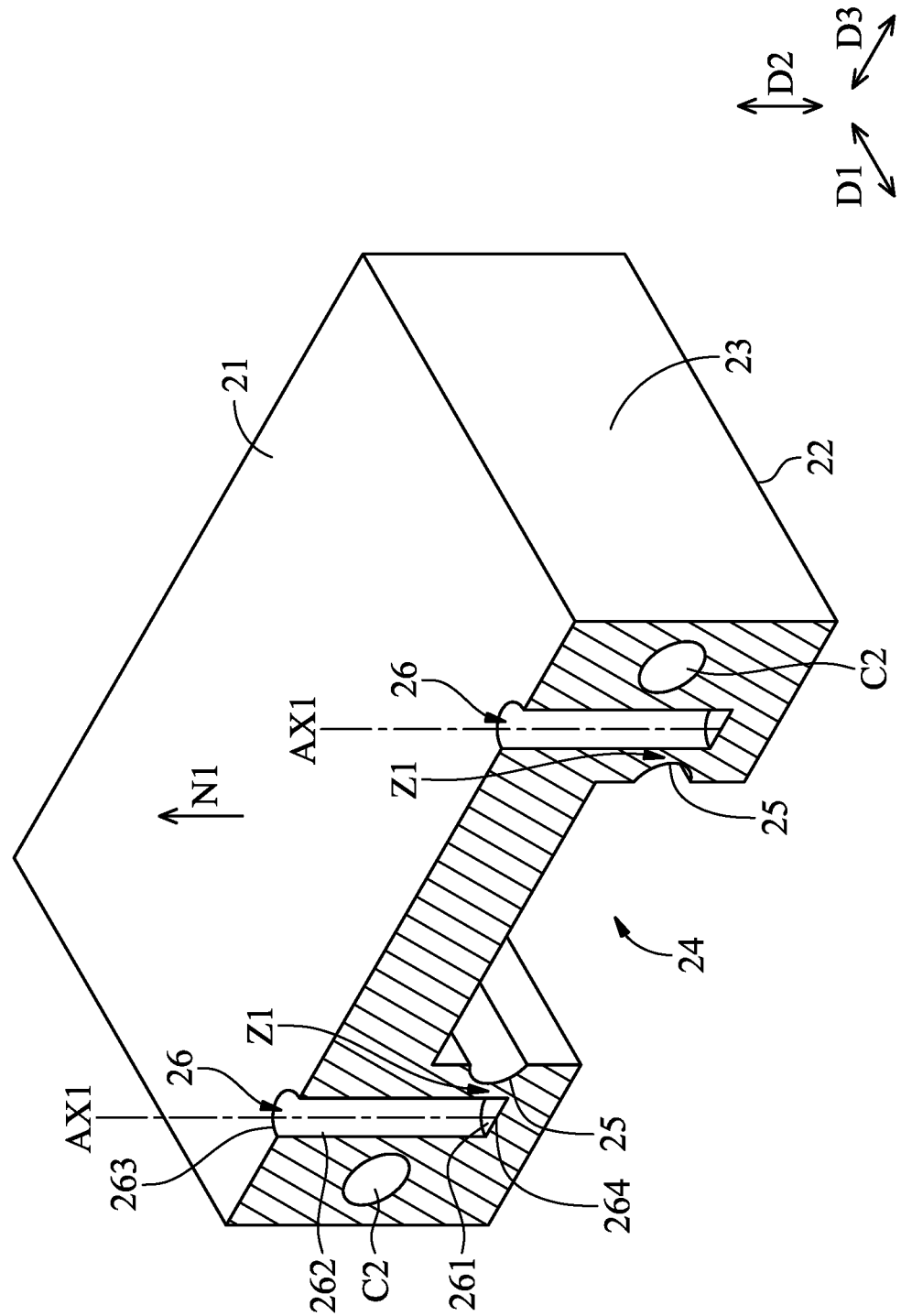
FIG. 3 is a cross-sectional view along the line AA in FIG. 2.
Figure 4:
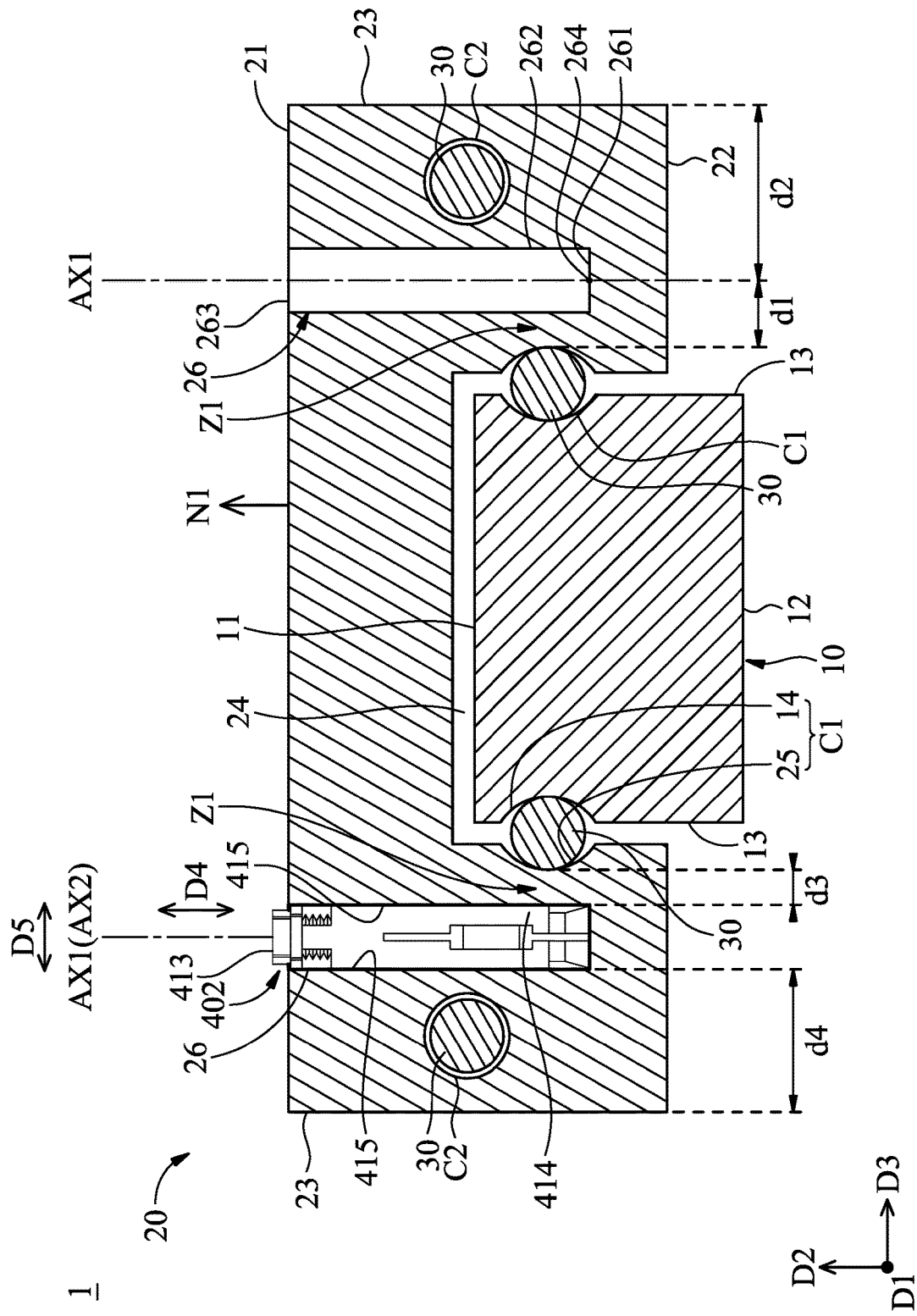
FIG. 4 is a cross-sectional view along the line BB in FIG. 1.

FIG. 2 is a schematic diagram of the slider 20 according to some embodiments of the disclosure. FIG. 3 is a cross-sectional view along the line AA in FIG. 2. FIG. 4 is a cross-sectional view along the line BB in FIG. 1. In the interest of brevity, one sensing module 40 is illustrated in FIG. 4, and the sensing module 40 in the right hole 26 is omitted in this figure. In this embodiment, the slider 20 can move in the first direction D1 with respect to the track 10.

The slider 20 includes an upper surface 21, a lower surface 22, two outer lateral surfaces 23, a sliding slot 24, two second recesses 25, a plurality of holes 26, and a plurality of deforming regions Z1. For example, in the embodiment in FIGS. 2-4, the slider has a hole 26 and a deforming region Z1 on the left, and further has an additional hole 26 and an additional deforming region Z1 on the right. The upper surface 21, the lower surface 22, the outer lateral surfaces 23, the sliding slot 24, and the second recesses 25 extend in the first direction D1. The upper surface 21 is parallel with the lower surface 22, and the upper surface 21 and the lower surface 22 are disposed on the opposite sides of the slider 20. The outer lateral surfaces 23 are connected to the upper surface 21 and the lower surface 22, and perpendicular to the upper surface 21 and the lower surface 22. In some embodiments, the outer lateral surfaces 23 are inclined with respect to the upper surface 21 and/or the lower surface 22, or have irregular structures as required. The appearances of the outer lateral surfaces 23 are not limited to the disclosure.

The sliding slot 24 is formed on the lower surface 22, and a portion of the track 10 is disposed in the sliding slot 24. Two second recesses 25 of the slider 20 are respectively formed on the opposite sides of the sliding slot 24, and corresponded to the first recesses 14 of the track 10. The holes 26 can be extended along the insertion axis AX1 from the surface of the slider 20 (such as the upper surface 21, the lower surface 22, or one of the outer lateral surfaces 23), so as to be formed inside the slider 20. In this embodiment, the holes 26 extend along the insertion axis AX1 from the upper surface 21 of the slider 20, so as to be formed inside the slider 20. The insertion axis AX1 can be perpendicular to the first direction D1 and parallel with the normal direction N1 of the upper surface 21 to improve the assembly and the measurement sensitivity of the sensing module 40.

In this embodiment, the first recesses 14 of the track 10 and the second recesses 25 of the slider 20 are coupled to form at least one channel C1. The channel C1 extends in the first direction D1. The deforming regions Z1 of the slider 20 are disposed between the holes 26 and the channel C1. In this embodiment, the slider 20 has two holes 26. In some embodiments, the slider 20 has one hole 26 or more than two holes 26. The numbers of the holes 26 can correspond to the numbers of the sensing module 40. As shown in FIG. 3, each of the holes 26 has an opening 263, and can be defined by an inner bottom surface 261 of the slider 20 and a lateral wall 262 of the slider 20. The insertion axis AX1 can pass through a centroid of the inner bottom surface 261, and each the holes 26 extends into the slider 20 along the insertion axis AX1. The lateral wall 262 surrounds the insertion axis AX1. The opening 263 is formed on the upper surface 21, and an end of the lateral wall 262 surrounds the opening 263.

As shown in FIGS. 1 and 4, the first recesses 14 of the track 10 and the second recesses 25 of the slider 20 are coupled to form at least one channel C1. The channel C1 extends in the first direction D1. Furthermore, the slider 20 further includes an outer channel C2 formed in the slider 20. The two ends of the outer channel C2 is communicated with the channel C1.

The rolling members 30 are disposed in the channel C1 and the outer channel C2. In other words, the rolling members 30 are disposed between the track 10 and the slider 20. When the slider 20 moves with respect to the track 10, the rolling members 30 cyclically move in the channel 10 and the outer channel C2. Furthermore, the rolling members 30 contact the track 10 and the slider 20 in the channel C1. In this embodiment, the rolling members 30 are balls. In some embodiments, the rolling members 30 are rollers disposed in the channel C1. When the slider 20 moves with respect to the track 10, the rolling members 30 rotate in the channel C1.

As shown in FIGS. 1 and 4, when the slider 20 is disposed on the track 10, the rolling members 30 contact the slider 20 and the track 10. Therefore, the weight of the slider 20 is applied on the rolling members 30 in the channel C1. The rolling members 30 apply a force to the slider 20, so that the deforming regions Z1 of the slider 20 may be deformed. Moreover, when a preload is applied to the rolling members 30, the rolling members 30 provides a reaction force to the slider 20 and the track 10 via the contacting point (or the contacting line), and the deforming regions Z1 may be deformed. In this disclosure, the aforementioned deforming regions Z1 are the regions of the slider 20 having a greater strain. As shown in FIG. 4, in this embodiment, the deforming regions Z1 are the regions between the holes 26 and the channel C1. More in detail, the deforming regions Z1 is the regions Z1 between the lateral wall 262, which defines the holes 26, and the channel C1.

The sensing modules 40 are disposed in the holes 26 of the slider 20, and contact the deforming regions Z1 of the slider 20. Therefore, the sensing modules 40 can detect the deforming regions Z1 of the slider 20 and generate a sensing signal. In this embodiment, the sensing modules 40 is configured to detect the amount of deformation and the temperature of the deforming regions Z1 of the slider 20. In this embodiment, the linear guideway 1 includes two sensing modules 40. In some embodiments, the linear guideway 1 includes one sensing module 40 or more than two sensing modules 40.

Figure 5A:
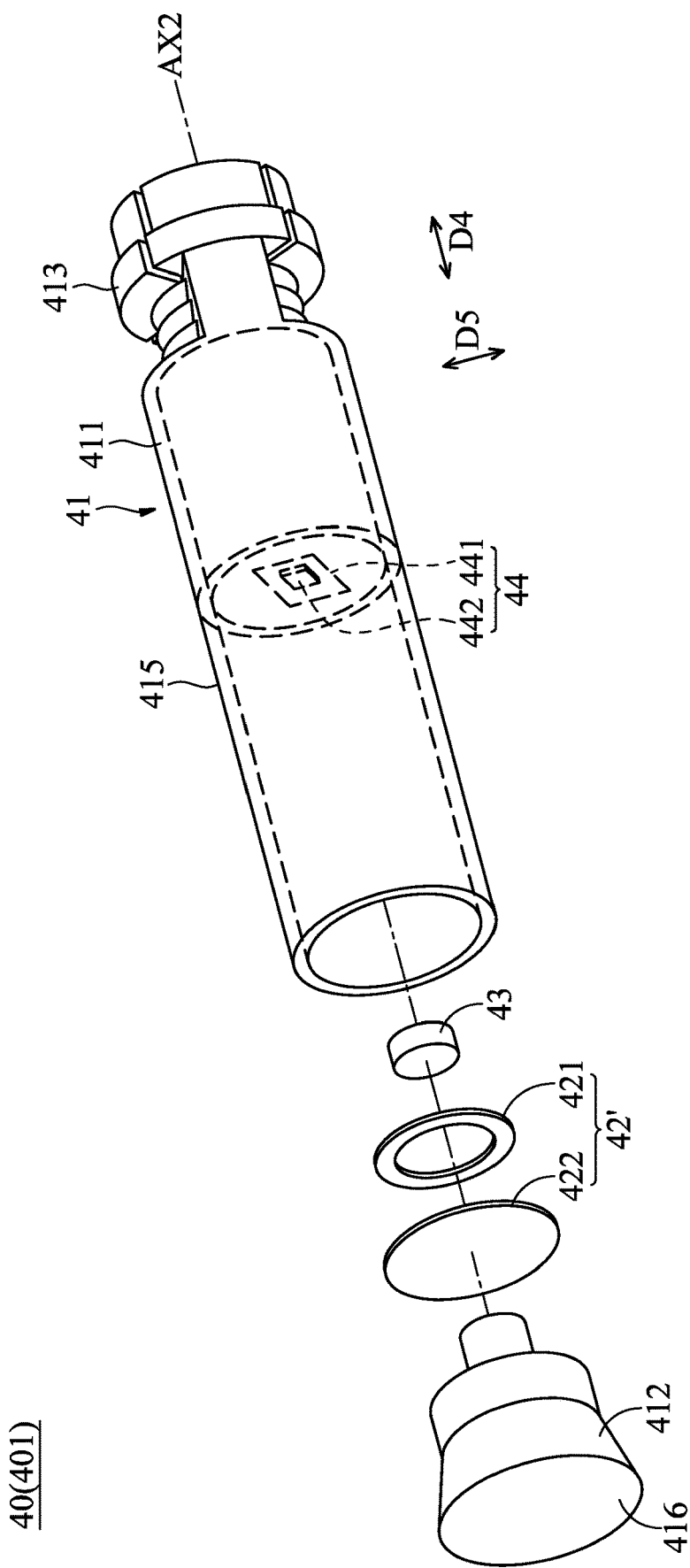
FIG. 5A is an exploded diagram of a sensing module according to a first embodiment of the disclosure.
Figure 5B:
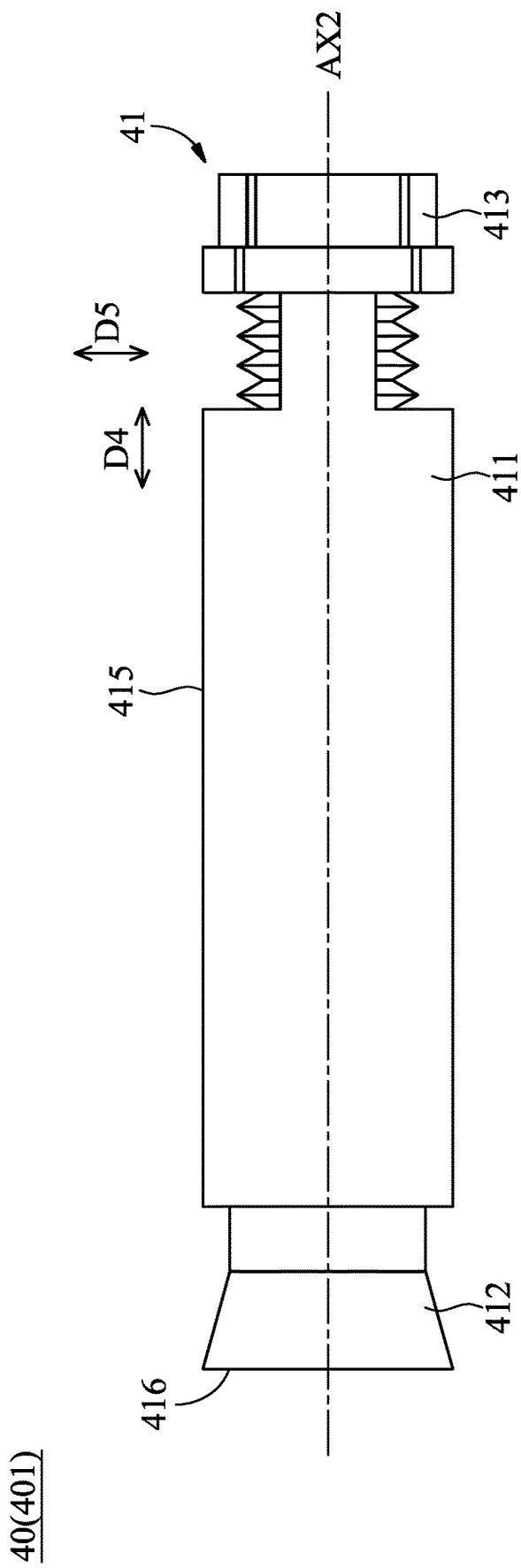
FIG. 5B is a front view of the sensing module according to the first embodiment of the disclosure.

In the disclosure, the sensing modules 40 can include various designs. FIGS. 5A and 5B respectively are an exploded diagram and a front view of a sensing module 40 according to an embodiment of the disclosure. The sensing module 40 shown in FIGS. 5A and 5B is a first sensing module 401. The first sensing module 401 includes a housing 41, a strain sensor 42', a temperature sensor 43, and a processing module 44. The housing 41 has a hollow structure. In this embodiment, the housing 41 has a pillar-shaped hollow structure or a cylindrical hollow structure. The housing 41 extends along a central axis AX2. The central axis AX2 passes the center of the housing 41, and extends in a direction that is parallel with the longitudinal direction D4.

The housing 41 of the first sensing module 401 includes a main body portion 411, a contacting portion 412, and a fixed portion 413. The main body portion 411 has a hollow structure, and extends along the central axis AX2. The contacting portion 412 is disposed on an end of the main body portion 411, and the fixed portion 413 is disposed on the other end of the main body portion 411. In other words, the main body portion 411 is dispose between the contacting portion 412 and the fixed portion 413. The contacting portion 412 can be made by a material having greater stiffness.

In detail, the strain sensor 42' includes a strain gauge 421 and an elastic member 422. The strain gauge 421 has an annular structure and is disposed on the elastic member 422. The elastic member 422 has a circular plate structure connected to the main body portion 411. When the contacting portion 412 transmits a force to the elastic member 422 of the strain sensor 42', the elastic member 422 has the amount of deformation in the longitudinal direction D4, and the strain gauge 421 generates an electrical signal. Therefore, the sensing module 40 can measure the force or the preload applied on the slider 20.

The temperature sensor 43 is disposed on the elastic member 422 and surrounded by the strain gauge 421. The temperature sensor 43 is configured to detect the environment temperature around the strain gauge 421, and generate a temperature signal according to the measured temperature. In this embodiment, the sensing signal includes the aforementioned temperature signal. Since the heat of the slider 20 is transmitted to the elastic member 422 and influences the accuracy of the strain gauge 421 when measuring the preload, the measured temperature from the temperature sensor 43 can be used to correct the measured result from the strain gauge 421, and the force applied on the elastic member 422 can be accurately obtained. In this embodiment, the strain gauge 421 surrounds the temperature sensor 43. In some embodiments, the temperature sensor 43 is disposed on the housing 41. In some embodiments, the temperature sensor 43 is exposed from the surface of the housing 41. In some embodiments, the sensing module 40 does not include temperature sensor 43.

Figure 6:
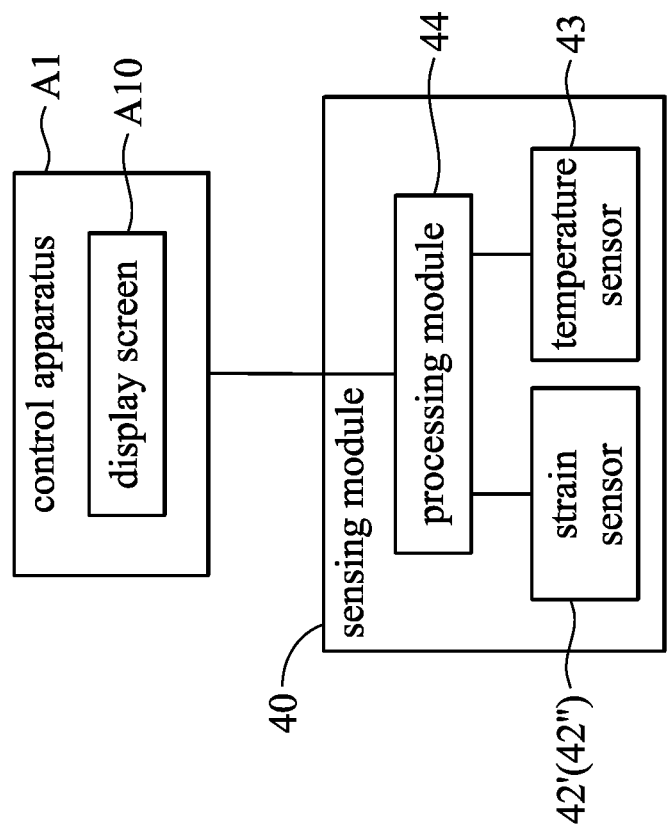
FIG. 6 is a system diagram of the sensing module and a control apparatus according to some embodiments of the disclosure.

The processing module 44 is electrically connected to the strain gauge 421 and the temperature sensor 43. The processing module 44 is configured to receive the sensing signal (including the strain signal or the temperature signal). The processing module 44 transmits the sensing signal to a control apparatus μl (as shown in FIG. 6). Referring to FIGS. 5A and 5B, in this embodiment, the processing module 44 includes a circuit board 441 and an application-specific integrated circuit (ASIC) 442, wherein the application-specific integrated circuit 442 is disposed on the circuit board 441. The application-specific integrated circuit 442 is electrically connected to the strain gauge 421 and the temperature sensor 43 to receive the strain sensing signal and the temperature sensing signal. Furthermore, the application-specific integrated circuit 442 can use the strain sensing signal and the temperature sensing signal to calibrate the preload.

Figure 5C:
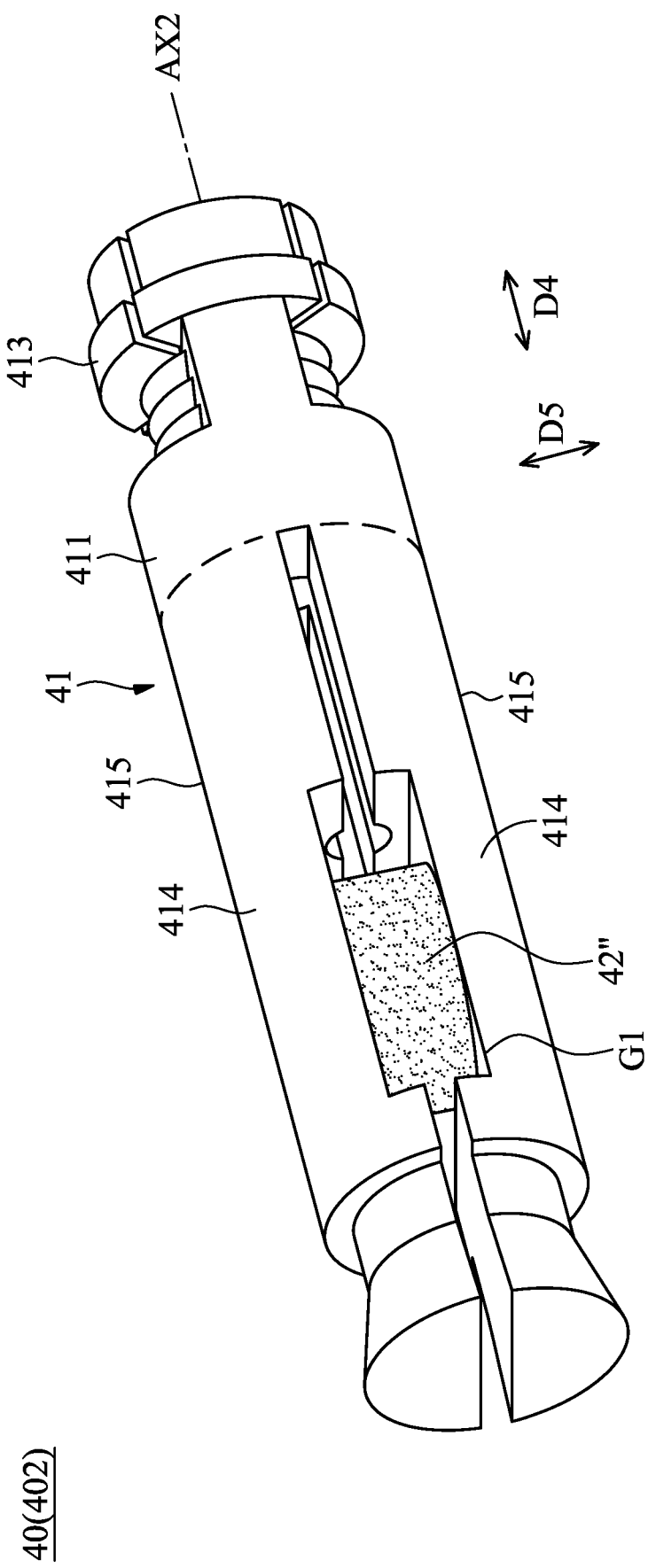
FIG. 5C is a schematic diagram of a sensing module according to a second embodiment of the disclosure.
Figure 5D:
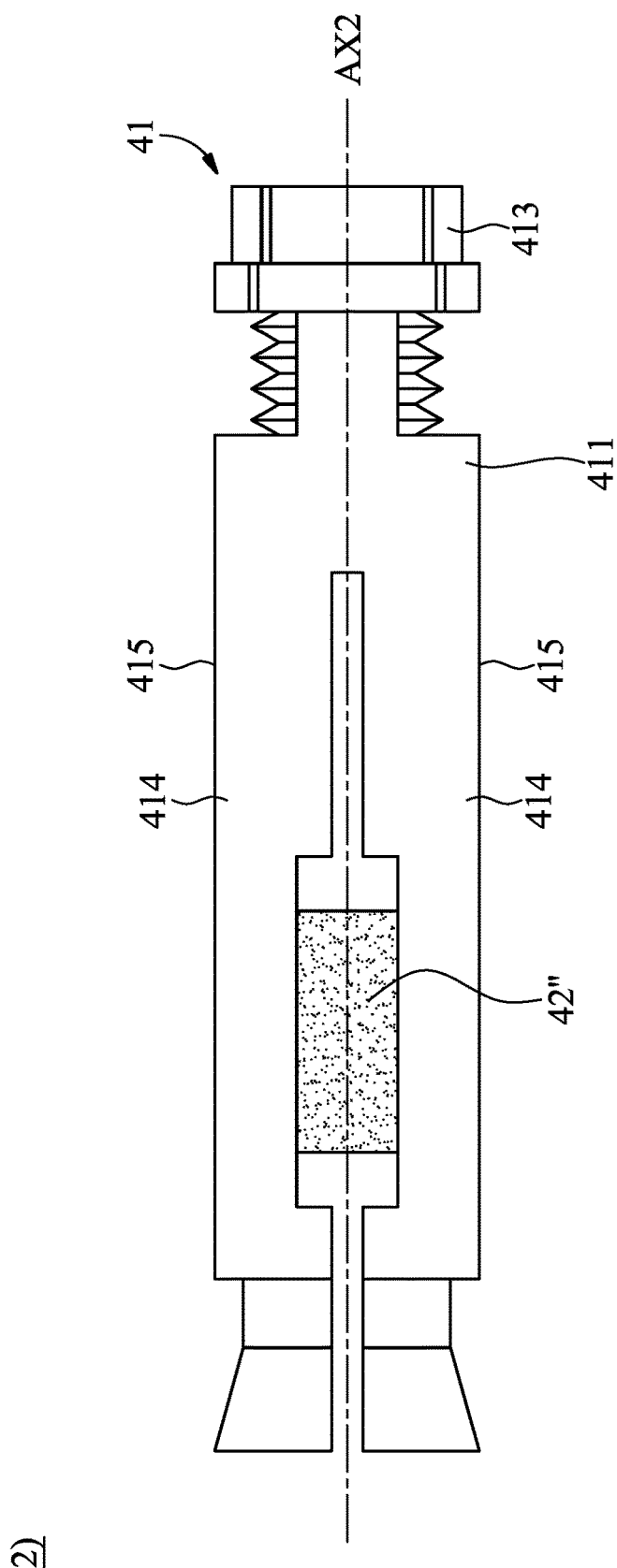
FIG. 5D is a front view of the sensing module according to the second embodiment of the disclosure.

The sensing modules 40 can include various designs. FIGS. 5C and 5D are respectively are a schematic diagram and a front view of a sensing module 40 according to another embodiment of the disclosure. The sensing module 40 shown in FIGS. 5C and 5D is a second sensing module 402. In this embodiment, the second sensing module 402 includes two elastic members 414 connected to the main body portion 411. The elastic members 414 and the main body portion 411 can be made of the same material, and can be integrally formed as one piece. The elastic members 414 extend along the longitudinal direction D4, and disposed on the opposite sides of the central axis AX2. A gap G1 is formed between two elastic members 414. A strain sensor 42" is disposed between two elastic members 414 and in the gap G1. In another embodiment, an application-specific integrated circuit (not shown) and a temperature sensor (not shown) are disposed in the gap G1 between two elastic members 414. The application-specific integrated circuit is electrically connected to the strain sensor 42" and the temperature sensor to receive the strain sensing signal and the temperature sensing signal. Furthermore, the application-specific integrated circuit can use the strain sensing signal and the temperature sensing signal to calibrate the preload.

Figure 5E:
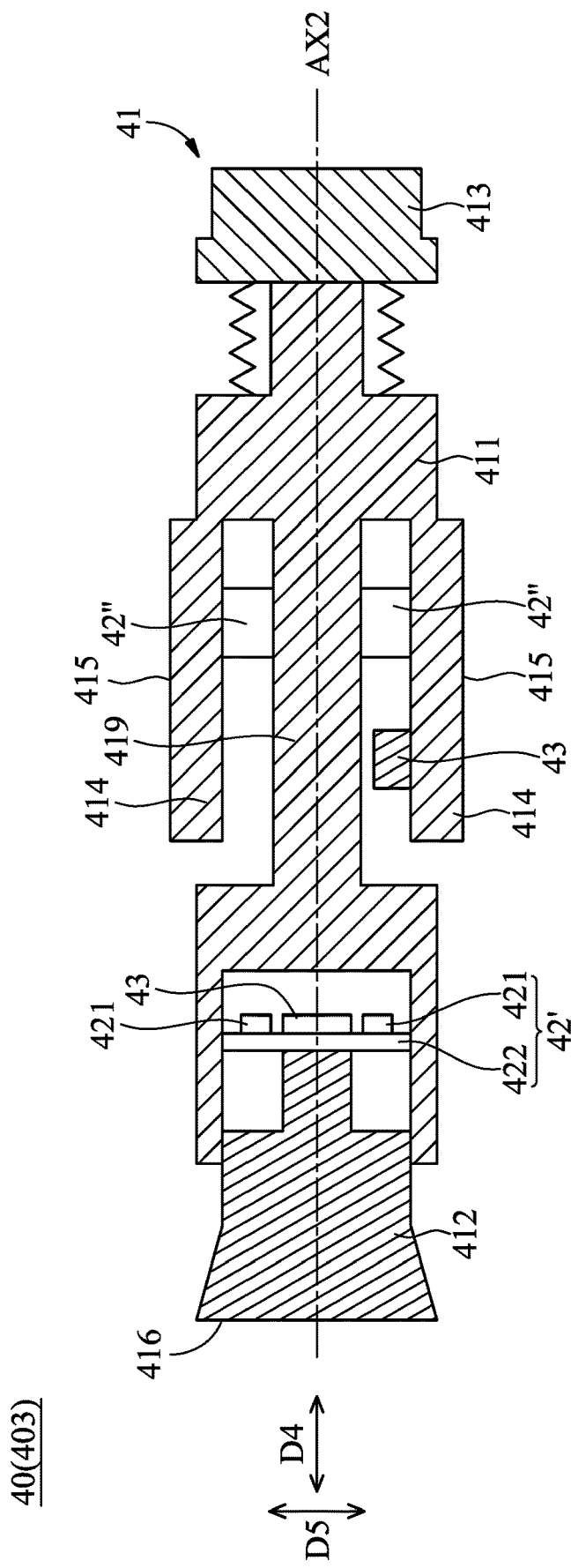
FIG. 5E is a schematic diagram of a sensing module according to a third embodiment of the disclosure.

FIG. 5E is a schematic diagram of a sensing module 40 according to another embodiment of the disclosure, wherein the sensing module 40 shown in FIG. 5E is a third sensing module 403. The third sensing module 403 includes a contacting portion 412, a supporting structure 419 having a greater stiffness in an axis direction, an elastic member 422 (a first elastic member), a strain sensor 42', two elastic members 414 (two second elastic members), and a strain sensor 42". The strain sensor 42' is disposed on the elastic member 422, and the elastic member 422 is connected to the contacting portion 412. The strain sensor 42' is configured to detect the amount of deformation of the elastic member 422 in the longitudinal direction D4. The strain sensor 42" is disposed between two elastic members 414, and configured to detect the amount of deformation of the elastic members 414 in a transverse direction D5. When the third sensing module 403 is disposed in a hole 26 on the track 10 or the slider 20, the deforming direction of the first elastic member 422 is parallel with the insertion axis AX1 of the hole 26, and the deforming direction of the second elastic members 414 are perpendicular to the insertion axis AX1 of the hole 26. Therefore, the measure accuracy of the third sensing module 403 can be increased by measuring a plurality of deforming regions in different positions.

The third sensing module 403 further includes at least one temperature sensor 43. As shown in FIG. 5E, the third sensing module 403 in this embodiment includes two temperature sensors 43. One of the temperature sensors 43 is disposed on the elastic member 422 of the strain sensor 42', and the other one of the temperature sensors 43 is disposed on the inner lateral surface of one of the elastic members 414. In some embodiments, the numbers and the positions of the temperature sensors 43 are not limited. The sensing module 40 can includes two or more than two temperature sensors 43.

As shown in FIGS. 1 and 4, when the slider 20 moves on the track 10 through the rolling members 30 for a period of time, the rolling members 30 may be worn, and the slider 20 cannot smoothly or accurately move on the track 10. The preload of the rolling members 30 applied on the slider 20 or the track 10 changes due to the wear of the rolling members 30. Therefore, by using the sensing module 40 to detect the variation of the amount of deformation of the track 10 or the slider 20, the user can determine whether the wear of the rolling members 30 exceeds the standard or not. If the wear rate of the rolling members 30 exceeds the standard, an appropriate maintenance (such as replacing the rolling members 30) is required.

FIG. 6 is a system diagram of the sensing module 40 and the control apparatus µl according to some embodiments of the disclosure. The processing module 44 can transmit sensing signal to the control apparatus µl via wired or wireless manner. The control apparatus µl can obtain the wear data of the rolling members 30 according to the received sensing signal. For example, the control apparatus µl can be a computer, a tablet computer, a smart phone, or a notebook computer, but is not limited thereto.

For example, when the sensing module 40 detects the unworn rolling members 30 (the wear rate is 0%), the sensing module 40 can detect a first amount of deformation. When the sensing module 40 detects the rolling members 30 with the wear rate 60%, the sensing module 40 can detect a second amount of deformation. When the sensing module 40 detects the rolling members 30 with the wear rate 80%, the sensing module 40 can detect a third amount of deformation. Since the third amount of deformation is greater than the second amount of deformation, and the second amount of deformation is greater than the first amount of deformation, the control apparatus A1 can determine the wear rate according to the measured amount of deformation from the sensing module 40.

In some embodiments, the control apparatus A1 can display a determination data on a display screen A10 according to the signal of the wear rate. The determination data can include the wear rate of the rolling members 30. The control apparatus A1 can generate an alarm signal when the wear rate exceeds a predetermined limit. The user can decide whether to replace the rolling members 30 according the wear rate shown on the display screen A10, so as to make sure that the slider 20 can continuously and smoothly move with respect to the track 10 and maintain the accuracy of the movement of the slider 20.

In this disclosure, when the slider 20 continuously moves on the track 10, the temperature of the rolling members 30 is increased. The temperature may cause an additional amount of deformation on the deforming region Z1, and the accuracy of the control apparatus A1 determining the wear rate of the rolling members 30 is effected. Therefore, the control apparatus A1 can correct the wear rate of the rolling members 30 according to the temperature signal. Owing to the temperature signal measured by the temperature sensor 43, the sensing module 40 in the disclosure can accurately monitor the degree of the wear rate of the rolling members 30 when the linear guideway 1 operates.

Referring to FIG. 6, the amount of deformation (displacement) measured by the sensing module 40 is obtained by the transformation of the total strain measured by the strain sensor 42' (42"). For example, the amount of deformation (displacement) of the measured object can be transformed by the measured total strain multiplied by the length of the measured object. The total strain measured by the strain sensor 42' (42") of the sensing module 40 includes a first strain and a second strain, wherein the first strain is caused by an external force (such as the preload), and the second strain is a thermal strain caused by the temperature. The second strain (thermal strain) should be subtracted from the total strain to obtain the correct first strain caused by the preload. More in detail, the valve of the second strain (thermal strain) changes according to the different temperature. Therefore, the regression equation of the second strain (thermal strain) and temperature or the graph of the relationship between the second strain (thermal strain) and temperature can be obtained by experiments. The regression equation or the graph of the relationship between the second strain (thermal strain) and temperature can be stored in the memory unit of the processing module 44. When the sensing module 40 measures, the second strain (thermal strain) can be obtained by the measured temperature from the temperature sensor 43 and the regression equation or the graph of the relationship. Subsequently, the correct first strain can be obtained by subtracting the second strain (thermal strain) from the total strain measured by the sensing module 40. The correct preload can be therefore obtained.

In FIG. 4, the second sensing module 402 in FIGS. 5C and 5D can be disposed in one of the holes 26 of the slider 20. The aforementioned hole 26 is formed on the slider 20, and it extends from the upper surface 21 along the insertion axis AX1 into the slider 20. The insertion axis AX1 is perpendicular to the first direction D1 and parallel with the normal direction N1 of the upper surface 21 (parallel with a second direction D2). The insertion axis AX1 coincides with or is parallel with the central axis AX2 of the sensing module 40. The insertion axis AX1 is parallel with the second direction D2, and perpendicular to the first direction D1 and a third direction D3. In this disclosure, the second direction D2 is Y-axis, the third direction D3 is X-axis, and the first direction D1 is Z-axis. In other words, the first direction D1, the second direction D2, and the third direction D3 are perpendicular to each other.

Referring to FIGS. 3, 4 and 5C, the lateral surfaces 415 of the elastic members 414 of the second sensing module 402 can contact the lateral wall 262 surrounding the hole 26. That is, the lateral surfaces 415 of the elastic members 414 of the second sensing module 402 can contact the deforming regions Z1. When a force (such as a preload) is applied on the slider 20 and the slider 20 is deformed, the deforming regions Z1 of the slider 20 compress the elastic members 414, and the elastic members 414 compress the stain sensor 42" and has the amount of deformation in the transverse direction D5 which is perpendicular to the insertion axis AX1.

The strain sensor 42" includes a piezoelectric member. When the strain sensor 42" is compressed and deformed, the resistance of the strain sensor 42" varies. The amount of deformation of the elastic members 414 can be obtained, and the amount of deformation of the deforming region Z1 in the transverse direction D5 can be obtained indirectly. The lateral surfaces 415 of the elastic members 414 contact the lateral wall 262 of the hole 26, so that the sensing module 40 can detect the amount of deformations of the elastic members 414 and the amount of deformations of the deforming region Z1 of the slider 20 in the transverse direction D5. The transverse direction D5 is perpendicular to the longitudinal direction D4. In some embodiments, the transverse direction D5 is the normal direction of the lateral surface 415 of the sensing module 40.

As shown in FIG. 4, the distance d1 from the insertion axis AX1 to the channel C1 is less than the distance d2 from the insertion axis AX1 to the outer lateral surface 23 which is closer to the insertion axis AX1. Therefore, the sensitivity of the second sensing module 402 measuring the deformation of the deforming region Z1 can be enhanced. In this embodiment, the transverse direction D5 is parallel with the third direction D3. Moreover, a direction of the deformation of the elastic members 414 (the transverse direction D5) is perpendicular to the insertion axis AX1 of the hole 26. Therefore, the sensitivity of the second sensing module 402 can be adjusted by adjusting the lengths of the elastic members 414 along the longitudinal direction D4.

As shown in left side of FIG. 4, the sensing module 40 can be disposed between the channel C1 and the outer channel C2. The distance d3 from the lateral surface 415 of the sensing module 40 to the closer channel C1 is less than the distance d4 from the lateral surface 415 of the sensing module 40 to the outer lateral surface 23.

In FIGS. 1-4, the track 10 has two first recesses 14 and the slider 20 has two second recesses 25, so that two first channels C1 can be formed. However, in some embodiments, the track 10 can have one first recess 14 and the slider 20 can have one second recess 25, so as to form a single first channel C1.

Figure 7:
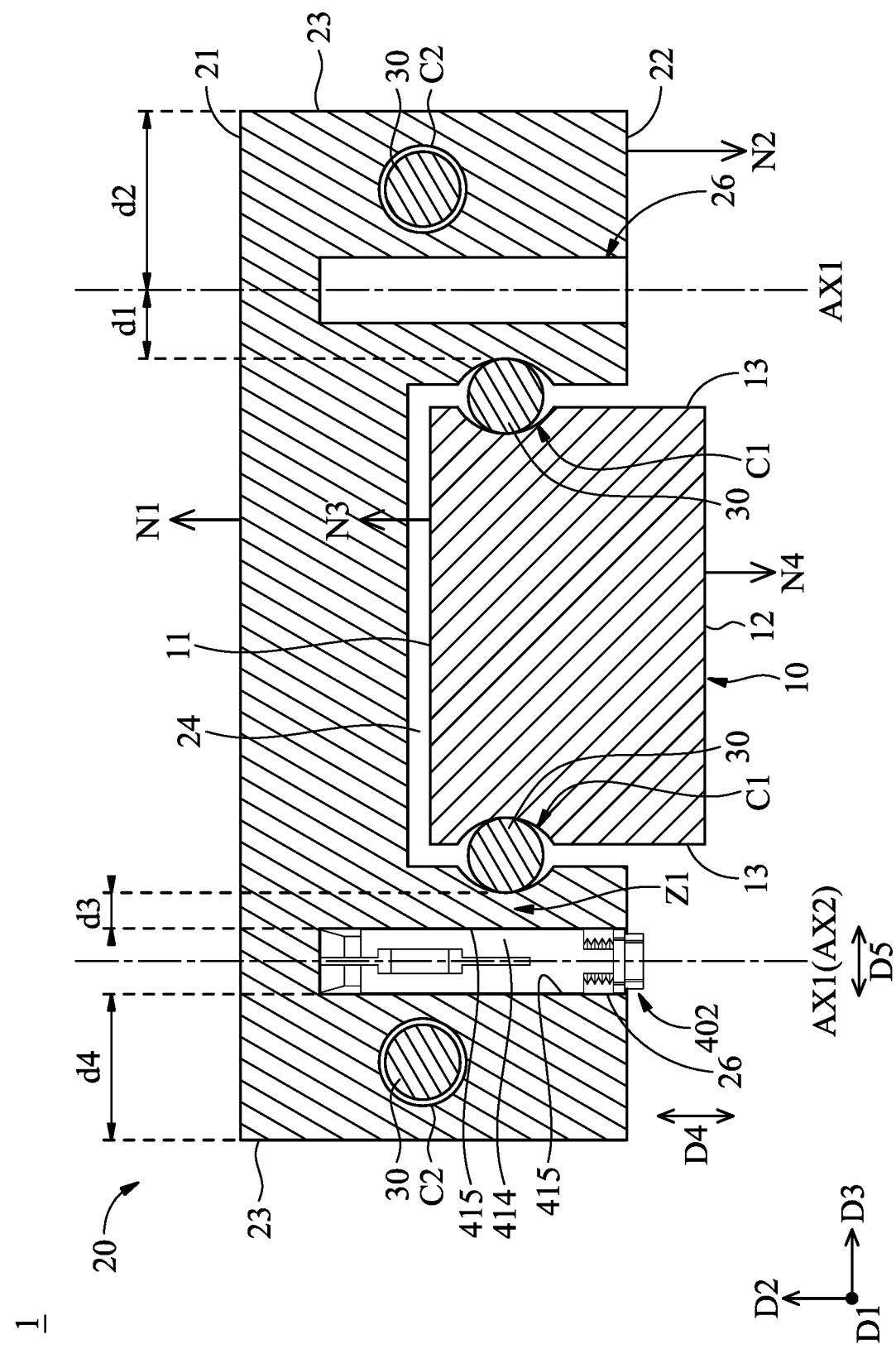
FIG. 7 is a cross-sectional view of a linear guideway according to some embodiments of the disclosure.

FIG. 7 is a cross-sectional view of a linear guideway 1 according to some embodiments of the disclosure. As shown in FIG. 7, the second sensing module 402 in FIG. 5C can be disposed in the hole 26. Moreover, in the interest of brevity, one second sensing module 402 is illustrated in FIG. 7, and the second sensing module 402 in the right hole 26 is omitted in this figure.

In FIG. 7, the hole 26 is formed in the slider 20 and extends from the lower surface 22 along the insertion axis AX1 and into the slider 20. The second sensing module 402 is disposed in the hole 26 via the lower surface 22. The insertion axis AX1 corresponding to the hole 26 is perpendicular to the first direction D1 and parallel with the normal direction N2 of the lower surface 22 (the normal direction N2 is parallel with the second direction D2). The insertion axis AX1 coincides with or is parallel with the central axis AX2 of the sensing module 40. As shown in right side of FIG. 7, the distance d1 from the insertion axis AX1 to the channel C1 is less than the distance d2 from the insertion axis AX1 to the outer lateral surface 23 which is closer to the insertion axis AX1. As shown in left side of FIG. 7, the distance d3 from the lateral surface 415 of the second sensing module 402 to the channel C1 is less than the distance d4 from the lateral surface 415 of the second sensing module 402 to the outer lateral surface 23. The arrangement of the lateral surface 415 of the second sensing module 402 is closer to the channel C1 enhances the sensitivity of the second sensing module 402 measuring the deformation of the deforming region Z1.

Figure 8:
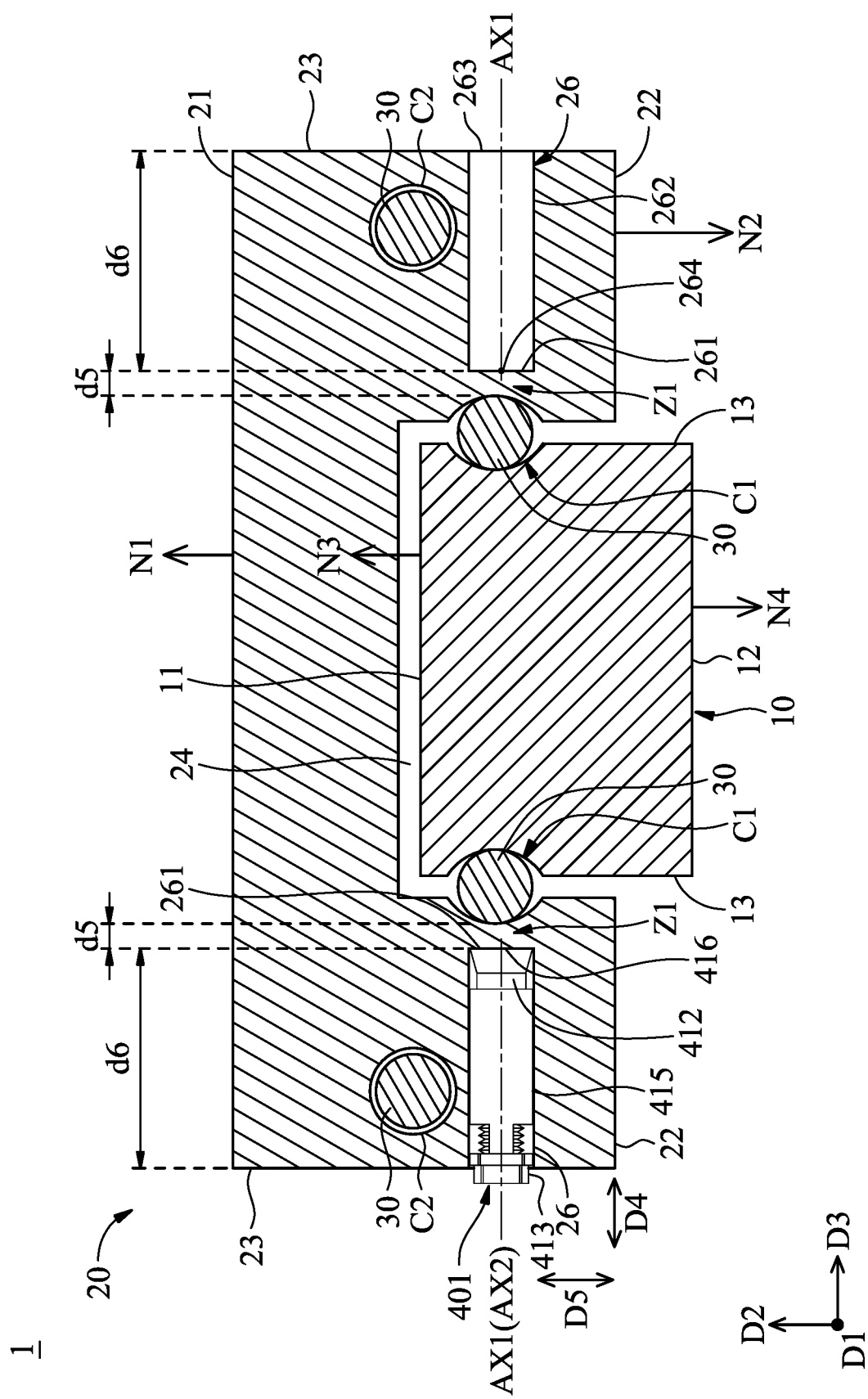
FIG. 8 is a cross-sectional view of a linear guideway according to some embodiments of the disclosure.

FIG. 8 is a cross-sectional view of a linear guideway 1 according to some embodiments of the disclosure. As shown in FIG. 8, the first sensing module 401 in FIG. 5A can be disposed in the hole 26. Moreover, in the interest of brevity, one first sensing module 401 on the left side is illustrated in FIG. 8, and the first sensing module 401 in the right hole 26 is omitted in this figure.

In FIG. 8, the hole 26 is formed in the slider 20 and extends from the outer lateral surface 23 along the insertion axis AX1 and into the slider 20. The first sensing module 401 is disposed in the hole 26 via the outer lateral surface 23. The insertion axis AX1 of the hole 26 is perpendicular to the first direction D1. The insertion axis AX1 coincides with or is parallel with the central axis AX2 of the first sensing module 401. The extensions of the insertion axis AX1 and the central axis AX2 can pass the channel C1. The insertion axis AX1 is parallel with the third direction D3 and perpendicular to the normal direction N1 of the upper surface 21 and the second direction D2.

The bottom surface 416 of the contacting portion 412 of the first sensing module 401 can contact the inner bottom surface 261 of the slider 20. The main body portion 411 of the first sensing module 401 can contact the lateral wall 262 of the hole 26. In this embodiment, when the deforming region Z1 of the slider 20 is deformed, a force is applied to the contacting portion 412 of the first sensing module 401. In this embodiment, the deforming region Z1 is the region between the hole 26 and the channel C1. More in detail, the deforming region Z1 is the region between the inner bottom surface 261 and the channel C1. Furthermore, the fixed portion 413 of the first sensing module 401 is disposed on the position of the opening 263 of the hole 26. The fixed portion 413 is configured to affix the first sensing module 401 in the hole 26 of the slider 20.

In some embodiments, the fixed portion 413 of the first sensing module 401 protrudes from the surface of the slider 20 (for example, the upper surface 21 or the lower surface 22 or the outer lateral surface 23), so as to facilitate the assembly or detachment of the sensing module 40 from the slider 20. In some embodiments, the fixed portion 413 of the first sensing module 401 does not protrude from the surface of the slider 20 (for example, the upper surface 21 or the lower surface 22 or the outer lateral surface 23).

Referring to FIGS. 5A and 8, the strain sensor 42' of the first sensing module 401 is disposed on the main body portion 411 and contacts one end of the contacting portion 412. The other end of the contacting portion 412 contacts the deforming region Z1 of the slider 20. When an external force or a preload is applied on the slider 20, a component force is applied on the inner bottom surface 261 of the deforming region Z1 along the longitudinal direction D4, and the component force is transmitted to the strain sensor 42' via the contacting portion 412. Therefore, the strain sensor 42' can detect the amount of deformation of the inner bottom surface 261 of the slider 20, and generate a strain signal according to the measured amount of deformation. In this embodiment, the sensing signal includes the strain signal.

As shown in FIG. 8, the distance d5 from the centroid 264 of the inner bottom surface 261 on the right side of the slider 20 to the channel C1 is less than the distance d6 from the centroid 264 of the inner bottom surface 261 to the outer lateral surface 23. The arrangement of the centroid 264 of the inner bottom surface 261 which is closer to the channel C1 enhances the sensitivity of the first sensing module 401 for measuring the deformation of the deforming region Z1. In this embodiment, the third direction D3 is parallel with the longitudinal direction D4. Furthermore, the direction of the deformation of the elastic member 422 of the first sensing module 401 in FIG. 5A (the longitudinal direction D4) is parallel with the insertion axis AX1 of the hole 26. Because the hole 26 has a sufficient space in the direction of the insertion axis AX1 (the longitudinal direction D4), the elastic member 422 of the first sensing module 401 can has more amount of deformation in the longitudinal direction D4. In other words, when the direction of the deformation of the elastic member 422 is parallel with the insertion axis AX1 of the hole 26, the sensitivity of the first sensing module 401 for measuring the deformation of the deforming region Z1 can be enhanced by reducing the stiffness of the elastic member 422 in the insertion axis AX1. Moreover, when the direction of the deformation of the elastic member 422 is parallel with the insertion axis AX1 of the hole 26, the measuring range of the first sensing module 401 can be adjusted by adjusting the stiffness of the elastic member 422 in the insertion axis AX1.

Furthermore, referring to the left side in FIG. 8, the first sensing module 401 is disposed between the outer channel C2 and the lower surface 22, and the bottom surface 416 of the contacting portion 412 of the first sensing module 401 contacts the inner bottom surface 261 at the end of the hole 26. The bottom surface 416 of the contacting portion 412 of the first sensing module 401 is adjacent to the channel C1. The distance d5 from the centroid of the bottom surface 416 of the contacting portion 412 of the first sensing module 401 to the channel C1 is less than the distance d6 from the centroid of the bottom surface 416 of the contacting portion 412 of the first sensing module 401 to the outer lateral surface 23.

Figure 9:
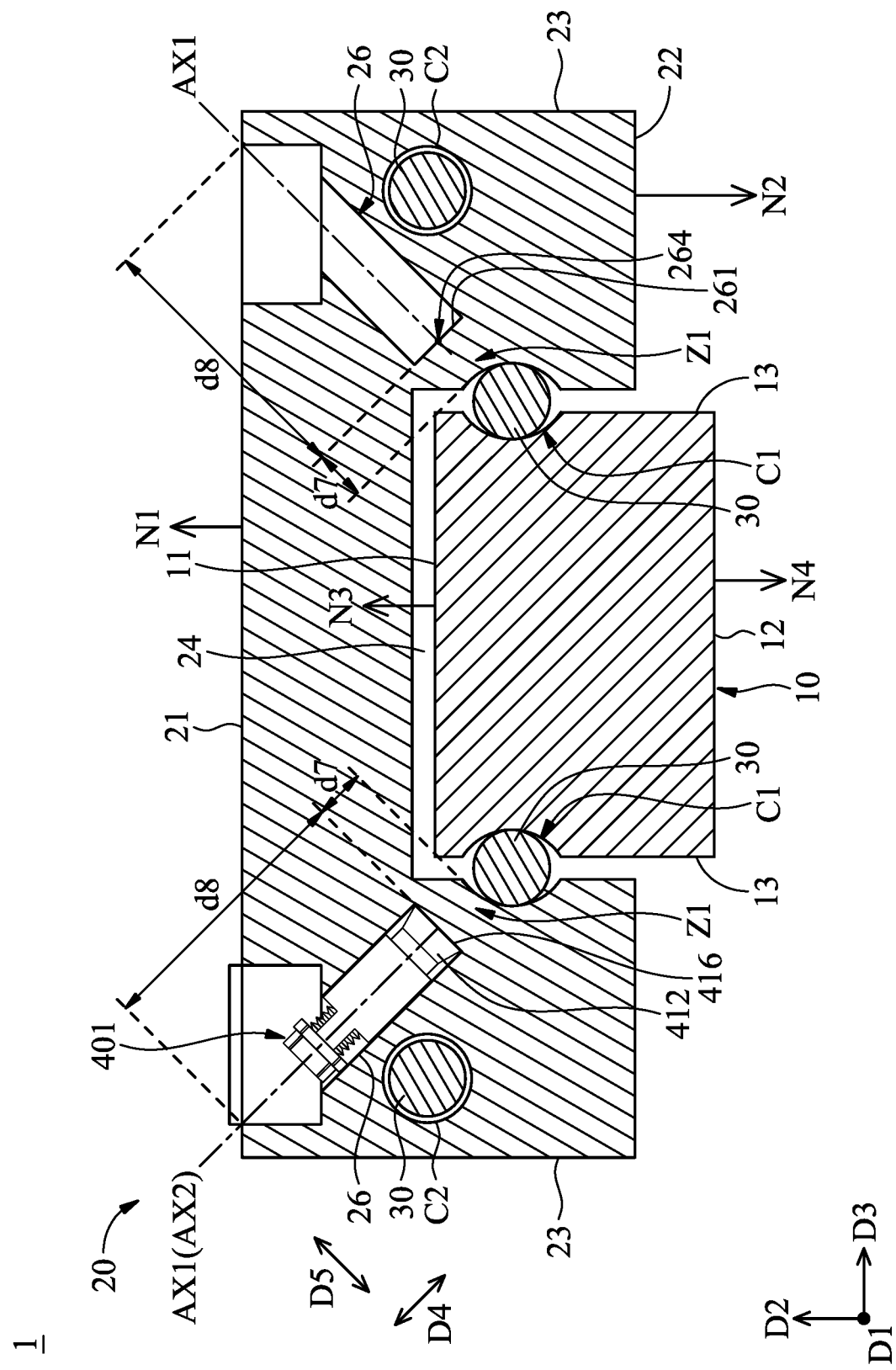
FIG. 9 is a cross-sectional view of a linear guideway according to some embodiments of the disclosure.

FIG. 9 is a cross-sectional view of a linear guideway 1 according to some embodiments of the disclosure. As shown in FIG. 9, the first sensing module 401 in FIG. 5A can be disposed in the hole 26. Moreover, in the interest of brevity, one first sensing module 401 on the left side is illustrated in FIG. 9, and the first sensing module 401 in the right hole 26 is omitted in this figure.

In FIG. 9, the hole 26 is formed in the slider 20 and extends from the upper surface 21 along the insertion axis AX1 and into the slider 20. The first sensing module 401 is disposed in the hole 26 via the upper surface 21. The insertion axis AX1 of the hole 26 is perpendicular to the first direction D1, and is not parallel with the normal direction N1 of the upper surface 21. In other words, the hole 26 is embedded in the slider 20 from the upper surface 21 with an inclined angle. The insertion axis AX1 coincides with or is parallel with the central axis AX2 of the first sensing module 401. The extensions of the insertion axis AX1 and the central axis AX2 can pass the channel C1. The insertion axis AX1 is inclined with respect to the second direction D2 and the third direction D3.

As shown in FIG. 9, the distance d7 from the centroid 264 of the inner bottom surface 261 at the end of the hole 26 to the channel C1 is less than the distance d8 from the centroid 264 of the inner bottom surface 261 to the upper surface 21. Therefore, the bottom surface 416 of the contacting portion 412 of the first sensing module 401 is adjacent to the deforming region Z1, and the first sensing module 401 can have higher sensitivity when measuring the deformation of the deforming region Z1. Furthermore, the direction of the elastic member 422 (the longitudinal direction D4) is parallel with the insertion axis AX1 of the hole 26.

Moreover, the first sensing module 401 is disposed between the outer channel C2 and the upper surface 21, and the bottom surface 416 of the contacting portion 412 of the first sensing module 401 is adjacent to the channel C1. The distance d7 from the center of the bottom surface 416 of the contacting portion 412 of the first sensing module 401 to the channel C1 is less than the distance d8 from the center of the bottom surface 416 of the contacting portion 412 of the first sensing module 401 to the upper surface 21 along the longitudinal direction D4.

Figure 10:
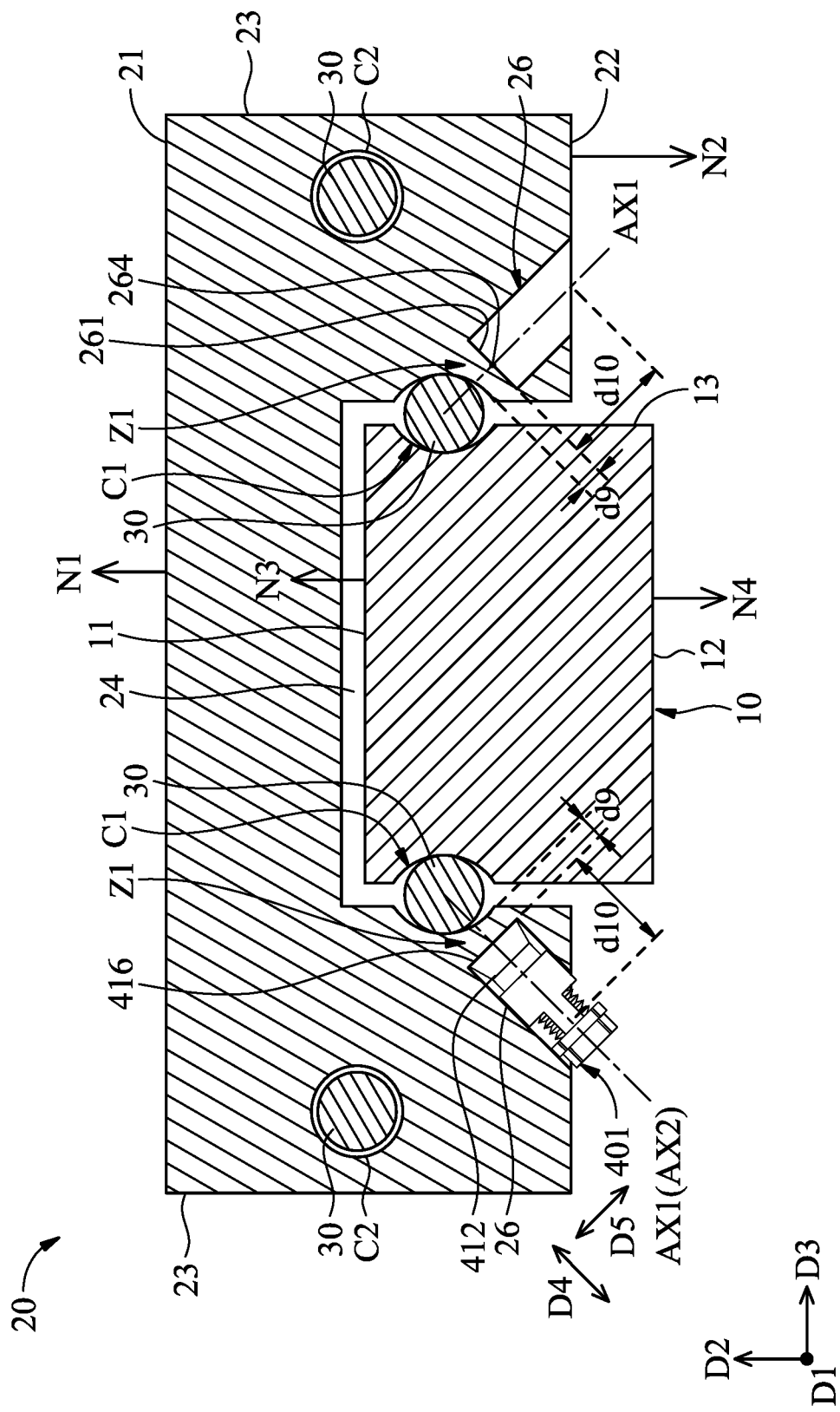
FIG. 10 is a cross-sectional view of a linear guideway according to some embodiments of the disclosure.

FIG. 10 is a cross-sectional view of a linear guideway 1 according to some embodiments of the disclosure. As shown in FIG. 10, the first sensing module 401 in FIG. 5A can be disposed in the hole 26. Moreover, in the interest of brevity, one first sensing module 401 on the left side is illustrated in FIG. 10, and the first sensing module 401 in the right hole 26 is omitted in this figure.

In FIG. 10, the hole 26 is formed in the slider 20 and extends from the lower surface 22 along the insertion axis AX1 and into the slider 20. The first sensing module 401 is disposed in the hole 26 via the lower surface 22. The insertion axis AX1 of the hole 26 is perpendicular to the first direction D1, and is inclined with respect to the lower surface 22. The insertion axis AX1 coincides with or is parallel with the central axis AX2 of the sensing module 40. The extensions of the insertion axis AX1 and the central axis AX2 pass the channel C1. The insertion axis AX1 is inclined with respect to the second direction D2 and the third direction D3.

Referring to the right side in FIG. 10, the distance d9 from the centroid 264 of the inner bottom surface 261 at the end of the hole 26 along the insertion axis AX1 to the channel C1 is less than the distance d10 from the centroid 264 of the inner bottom surface 261 along the insertion axis AX1 to the lower surface 22. Similar to the embodiment of FIG. 9, when the first sensing module 401 is disposed in the hole 26 in FIG. 10, the bottom surface 416 of the contacting portion 412 of the first sensing module 401 is adjacent to the deforming region Z1, and the first sensing module 401 can have higher measuring sensitivity.

Referring to the left side in FIG. 10, the first sensing module 401 is disposed below the outer channel C2 and the channel C1, and the bottom surface 416 of the contacting portion 412 of the first sensing module 401 is adjacent to the channel C1. The distance d9 from the center of the bottom surface 416 of the contacting portion 412 of the first sensing module 401 to the channel C1 along the insertion axis AX1 is less than the distance d10 from the center of the bottom surface 416 of the contacting portion 412 of the first sensing module 401 to the lower surface 22 along the insertion axis AX1. Furthermore, the direction of the deformation of the elastic member 422 (the longitudinal direction D4) is parallel with the insertion axis AX1 of the hole 26. Therefore, the measuring sensitivity of the first sensing module 401 can be enhanced by reducing the stiffness of the elastic member 422 in the longitudinal direction D4. In this embodiment, when the direction of the deformation of the elastic member 422 is parallel with the insertion axis AX1 of the hole 26, the measuring range of the first sensing module 401 can be adjusted by adjusting the stiffness of the elastic member 422 in the insertion axis AX1.

Figure 11:
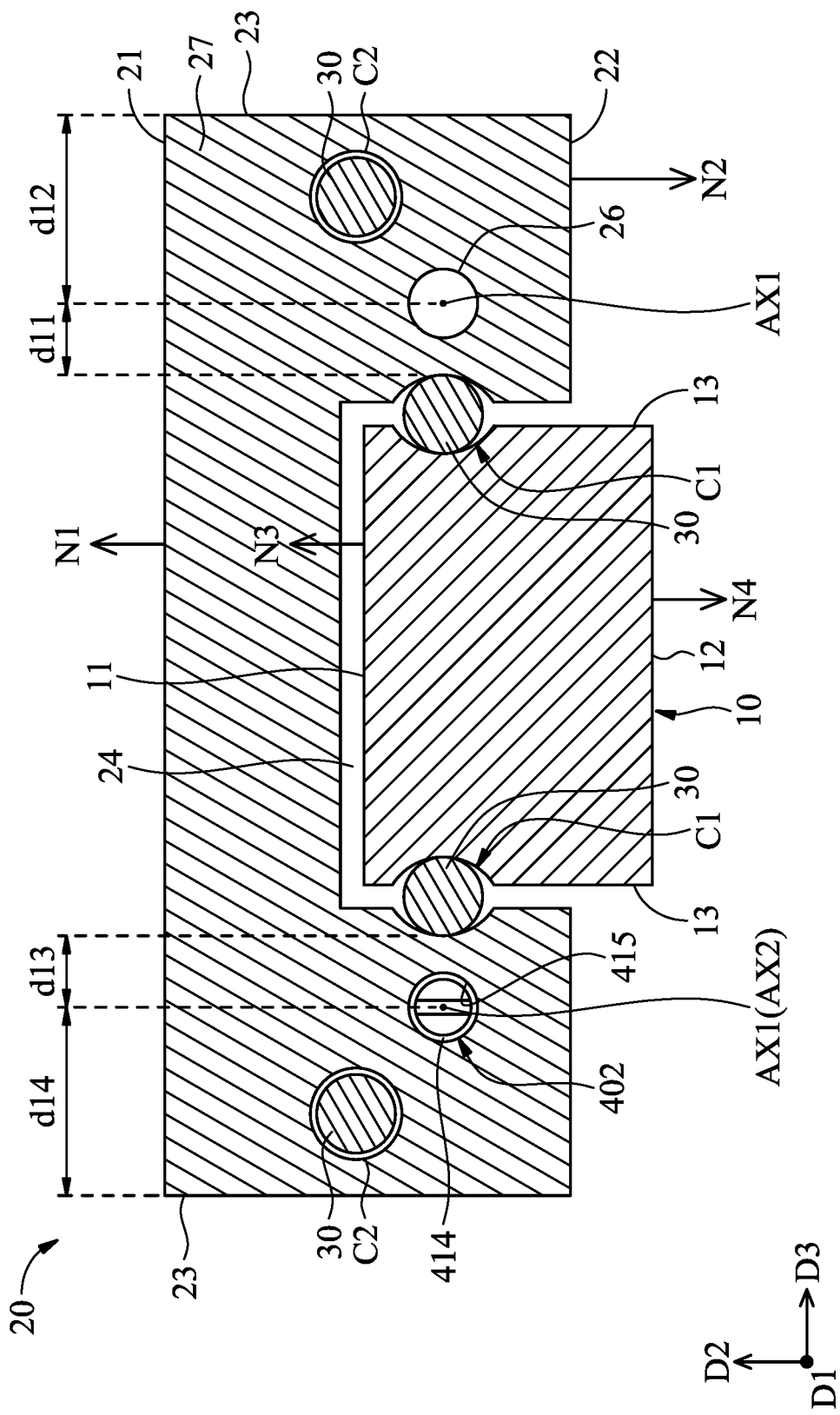
FIG. 11 is a cross-sectional view of a linear guideway according to some embodiments of the disclosure.

FIG. 11 is a cross-sectional view of a linear guideway 1 according to some embodiments of the disclosure. As shown in FIG. 11, the second sensing module 402 in FIG. 5C can be disposed in the hole 26. Moreover, in the interest of brevity, one second sensing module 402 on the left side is illustrated in FIG. 11, and the second sensing module 402 in the right hole 26 is omitted in this figure.

In FIG. 11, the hole 26 is formed in the slider 20 and extends from a cross-section 27 (as shown in FIG. 1) along the insertion axis AX1 and into the slider 20. The second sensing module 402 in FIG. 5C is disposed in the hole 26 via the cross-section 27. It should be noted that the insertion axis AX1 of the hole 26 is parallel with the first direction D1. The insertion axis AX1 coincides with or is parallel with the central axis AX2 of the second sensing module 402, and is perpendicular to the second direction D2 and the third direction D3. When the insertion axis AX1 of the hole 26 is parallel with the first direction D1, the effect to the stiffness of the slider 20 is reduced. Thus, the unexpected deformation when the preload applies to the slider 20 can be prevented, and the effect to the accuracy of the preload measurement can be avoided. In other words, when the insertion axis AX1 is parallel with the first direction D1, the measuring sensitivity of the second sensing module 402 can be enhanced.

As shown in FIG. 11, the distance d11 from the insertion axis AX1 to the channel C1 is less than the distance d12 from the insertion axis AX1 to the outer lateral surface 23 of the slider 20. Therefore, when the second sensing module 402 is disposed in the hole 26 in FIG. 11, the second sensing module 402 can have the better measuring sensitivity.

Referring to the left side in FIG. 11, the second sensing module 402 can be disposed between the outer channel C2 and the channel C1. The direction of the amount of deformation of the elastic members 414 of the second sensing module 402 (the second direction D2 or the third direction D3) is perpendicular to the insertion axis AX1 of the hole 26. The lateral surface 415 of the second sensing module 402 is adjacent to the channel C1. The distance d13 from the lateral surface 415 of the second sensing module 402 to the channel C1 is less than the distance d14 from the lateral surface 415 of the second sensing module 402 to the outer lateral surface 23.

Figure 12:
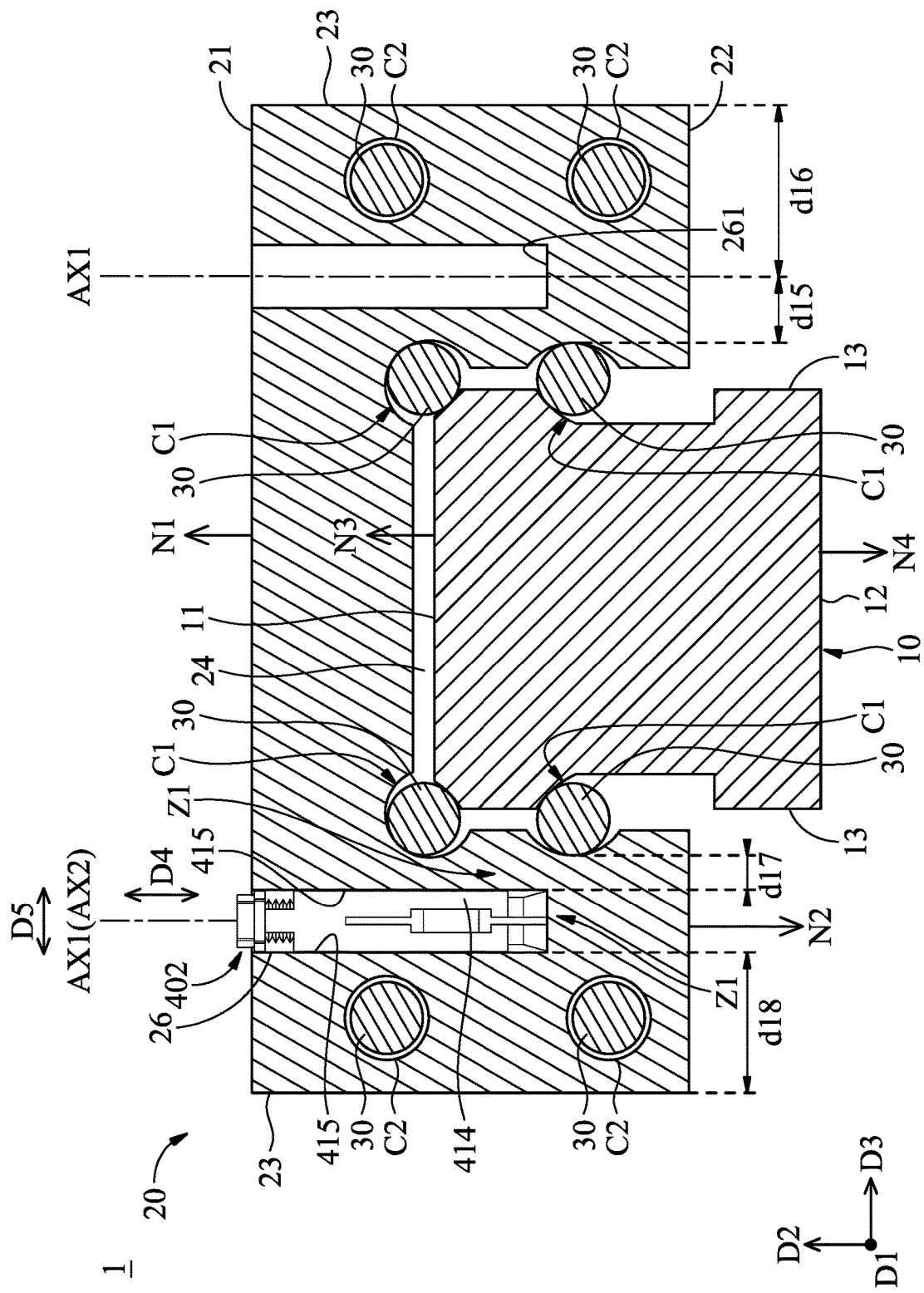
FIG. 12 is a cross-sectional view of a linear guideway according to some embodiments of the disclosure.

FIG. 12 is a cross-sectional view of a linear guideway 1 according to some embodiments of the disclosure. In this embodiment, the linear guideway 1 has four channels C1 formed between the track 10 and the slider 20. Four channels C1 extend in the direction parallel with the first direction D1. Moreover, the slider 20 has four outer channels C2. Each of the outer channels C2 is connected to the corresponding channel C1. In this embodiment, the rolling members 30 are balls. In some embodiments, the rolling members are rollers disposed in the channels C1. In some embodiments, the linear guideway 1 does not include any outer channel C2.

Referring to FIG. 12, in this embodiment, the second sensing module 402 in FIG. 5C and the third sensing module 403 in FIG. 5E can be selectively disposed in the hole 26. Moreover, in the interest of brevity, FIG. 12 offers the second sensing module 402 as an example, one second sensing module 402 is illustrated, and the second sensing module 402 in the right hole 26 of the slider 20 is omitted.

In FIG. 12, the hole 26 is formed in the slider 20 and extends from the upper surface 21 along the insertion axis AX1 and into the slider 20. The second sensing module 402 is disposed in the hole 26 via the upper surface 21. In some embodiments, the inner bottom surface 261 at the end of the hole 26 is adjacent to the lower surface 22, and the hole 26 is disposed between two channels C1 and between two outer channels C2. The insertion axis AX1 is perpendicular to the first direction D1 and parallel with the normal direction N1 of the upper surface 21. The insertion axis AX1 coincides with or is parallel with the central axis AX2. The insertion axis AX1 is parallel with the second direction D2 and perpendicular to the third direction D3.

As shown in right side of FIG. 12, the distance d15 from the insertion axis AX1 to the channel C1 is less than the distance d16 from the insertion axis AX1 to the outer lateral surface 23. Therefore, when the second sensing module 402 is disposed in the hole 26, the second sensing module 402 can have the better measuring sensitivity. Furthermore, the direction of the deformation of the elastic members 414 of the sensing module 40 (the transverse direction D5) is perpendicular to the insertion axis AX1 of the hole 26. Therefore, the second sensing module 402 can suitably adjust the measuring sensitivity according to the type or the size of the linear guideway 1.

As shown in left side of FIG. 12, the second sensing module 402 can be disposed between the channel C1 and the outer channel C2. The distance d17 from the lateral surface 415 of the second sensing module 402 to the adjacent channel C1 is less than the distance d18 from the lateral surface 415 of the second sensing module 402 to the outer lateral surface 23 of the slider 20.

In some embodiments, the hole 26 can be formed on the other surface. For example, the hole 26 can be formed on the lower surface 22 of the slider 20, and extends into the slider 20. The inner bottom surface 261 at the end of the hole 26 is adjacent to the upper surface 21, so that the hole 26 is disposed between two channels C1 and between two outer channels C2. The second sensing module 420 can be disposed in the hole 26 via the lower surface 22.

Figure 13:
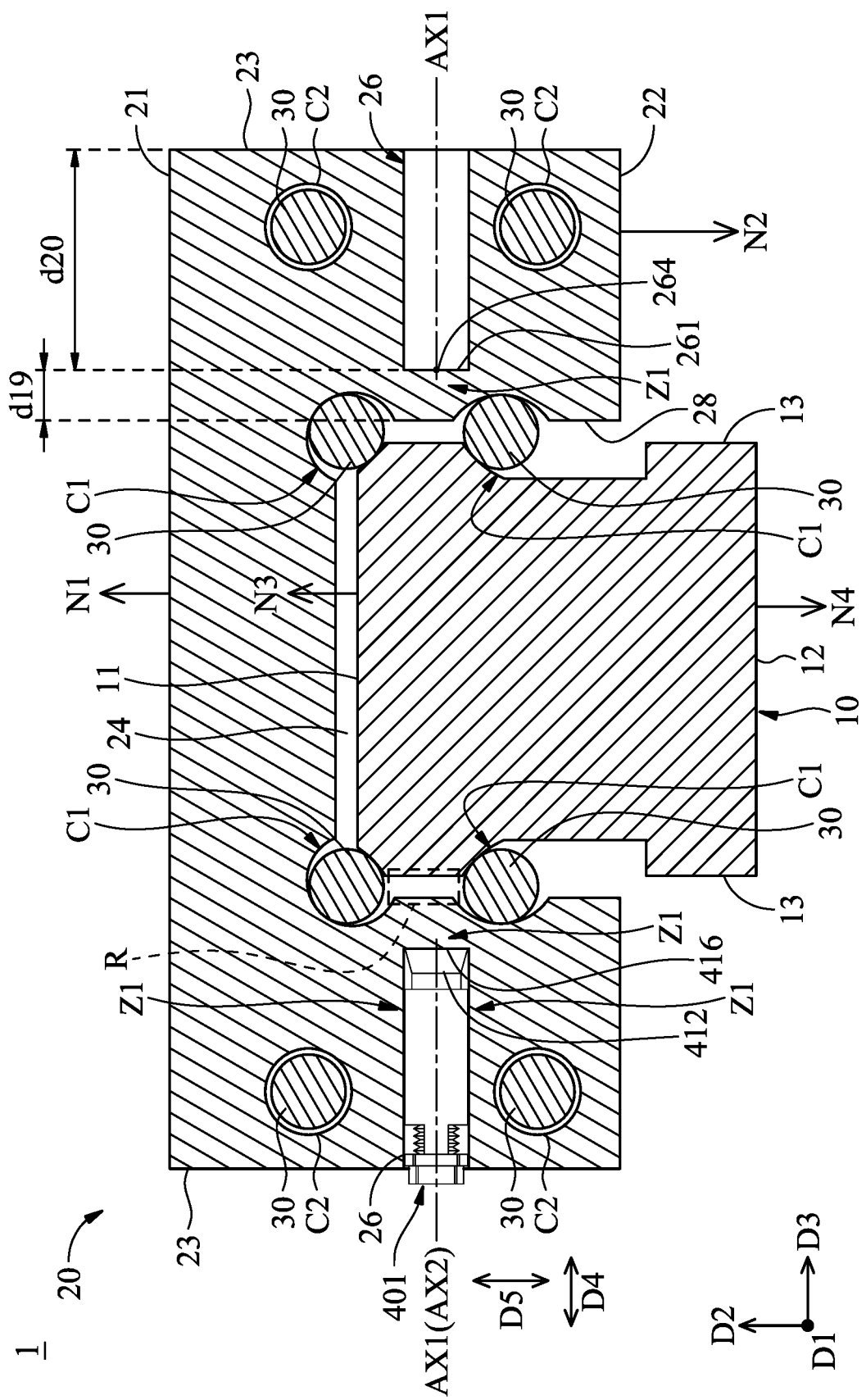
FIG. 13 is a cross-sectional view of a linear guideway according to some embodiments of the disclosure.

FIG. 13 is a cross-sectional view of a linear guideway 1 according to some embodiments of the disclosure. In this embodiment, the first sensing module 401 in FIG. 5A and the third sensing module 403 in FIG. 5E can be selectively disposed in the hole 26. Moreover, in the interest of brevity, FIG. 13 offers the first sensing module 401 as an example, one first sensing module 401 is illustrated, and the first sensing module 401 in the right hole 26 is omitted.

In FIG. 13, the hole 26 is formed in the slider 20 and extends from the outer lateral surface 23 along the insertion axis AX1 and into the slider 20. The first sensing module 401 is disposed in the hole 26 via the outer lateral surface 23. The hole 26 and the first sensing module 401 are disposed between two adjacent outer channels C2. The inner bottom surface 261 at the end of the hole 26 and the bottom surface 416 of the contacting portion 412 of the first sensing module 401 are adjacent to a center area R of two adjacent channels C1. In other words, the extensions of the insertion axis AX1 and the central axis AX2 can pass the center area R between two channels C1.

As shown in right side of FIG. 13, the distance d19 from the centroid 264 of the inner bottom surface 261 at the end of the hole 26 to an inner lateral surface 28 of the slider 20 is less than the distance d20 from the centroid 264 of the inner bottom surface 261 to the outer lateral surface 23. Therefore, when the first sensing module 401 is disposed in the hole 26, the measuring sensitivity of the first sensing module 401 can be enhanced. In other words, when the distance d19 from the center of the bottom surface 416 of the contacting portion 412 of the first sensing module 401 to the inner lateral surface 28 of the slider 20 is less than the distance d20 from the center of the bottom surface 416 of the contacting portion 412 of the first sensing module 401 to the outer lateral surface 23, the first sensing module 401 can have the better measuring sensitivity. Furthermore, the direction of the deformation of the elastic member 422 of the first sensing module 401 (the longitudinal direction D4) is parallel with the insertion axis AX1 of the hole 26. Therefore, the first sensing module 401 can suitably adjust the range of the preload and the measuring sensitivity according to the type or the size of the linear guideway 1.

Figure 14:
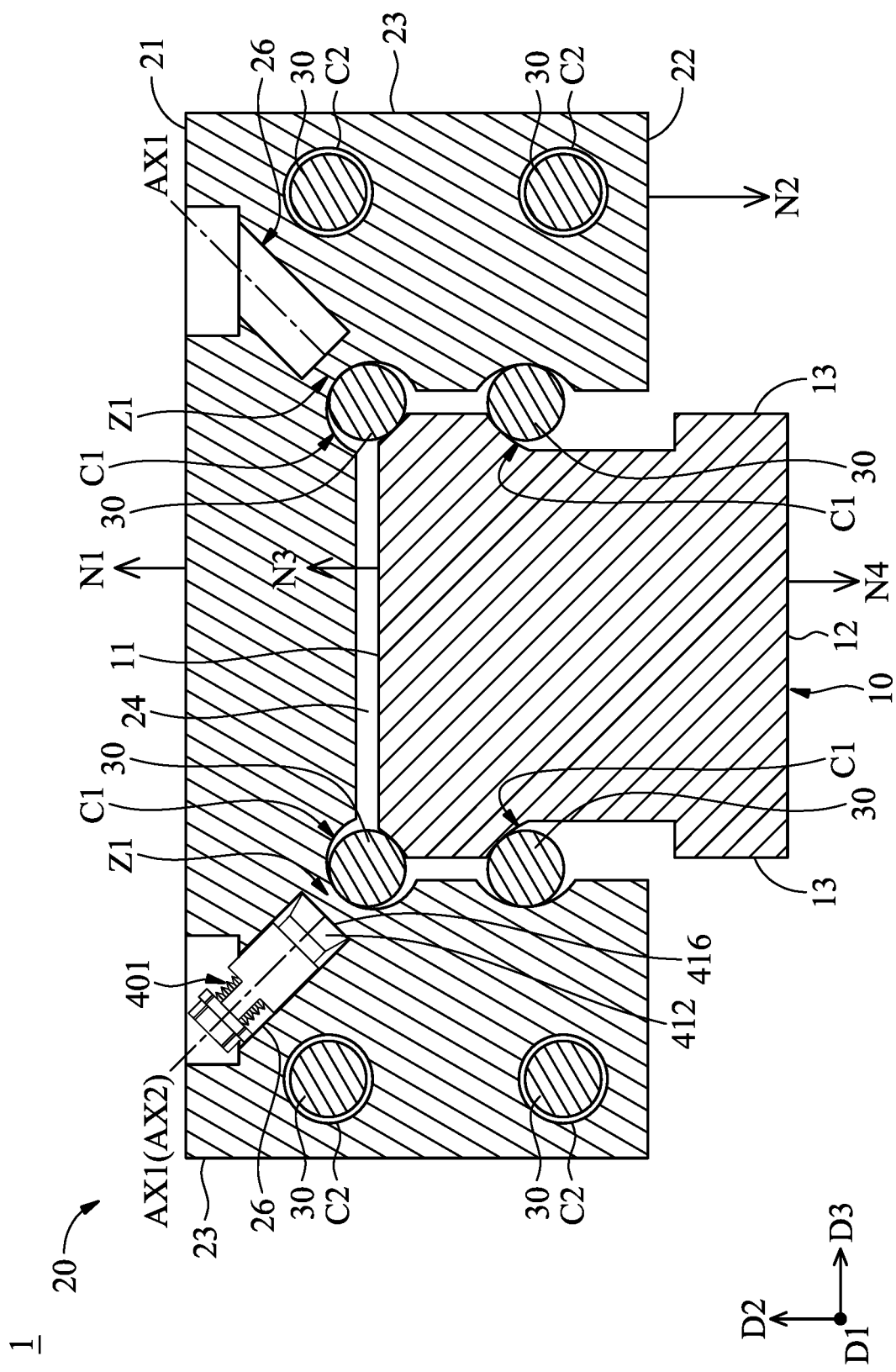
FIG. 14 is a cross-sectional view of a linear guideway according to some embodiments of the disclosure.

FIG. 14 is a cross-sectional view of a linear guideway 1 according to some embodiments of the disclosure. In this embodiment, the first sensing module 401 in FIG. 5A and the third sensing module 403 in FIG. 5E can be selectively disposed in the hole 26. Moreover, in the interest of brevity, FIG. 14 offers the first sensing module 401 as an example, one first sensing module 401 is illustrated, and the first sensing module 401 in the right hole 26 is omitted. In this embodiment, the hole 26 is formed on the upper surface 21 of the slider 20 and extends into the slider 20 in an inclined manner. Specifically, the insertion axis AX1 of the hole 26 is perpendicular to the first direction D1, and inclined with respect to the second direction D2 and the third direction D3. The first sensing module 401 can be disposed in the hole 26 via the upper surface 21.

In some embodiments, the hole 26 can be formed on the lower surface 22 of the slider 20, and it extends into the slider 20 in an inclined manner. In other words, in these embodiments, the insertion axis AX1 of the hole 26 is perpendicular to the first direction D1, and inclined with respect to the second direction D2 and the third direction D3. The first sensing module 401 can be disposed in the hole 26 via the lower surface 22.

Figure 15:
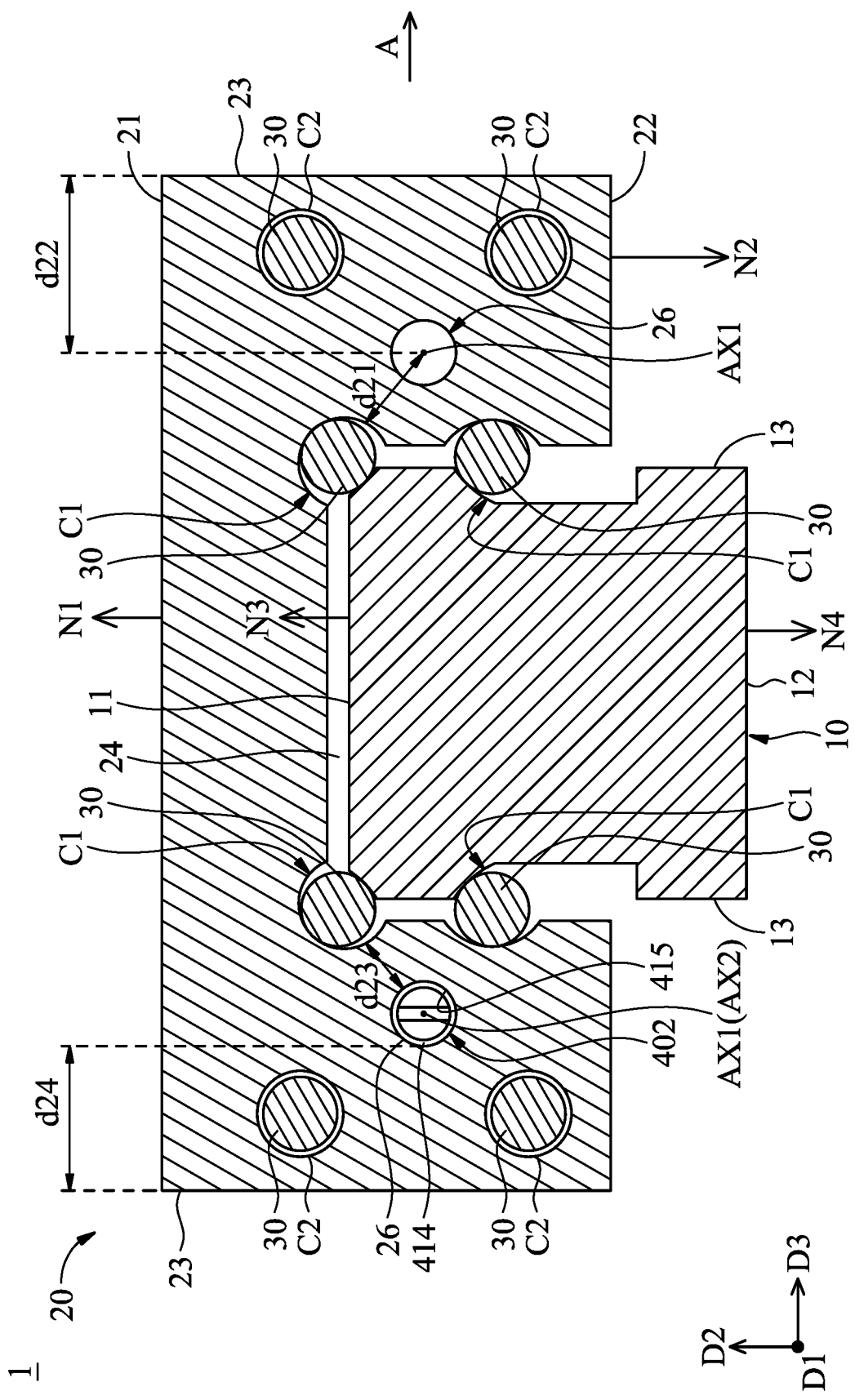
FIG. 15 is a cross-sectional view of a linear guideway according to some embodiments of the disclosure.

FIG. 15 is a cross-sectional view of a linear guideway 1 according to some embodiments of the disclosure. In this embodiment, the second sensing module 402 in FIG. 5C is disposed in the hole 26. In this embodiment, the hole 26 is formed in the slider 20 and extends from the cross-section 27 (as shown in FIG. 1) along the insertion axis AX1 and into the slider 20. The second sensing module 402 can be disposed in the hole 26 via the cross-section 27. The hole 26 and the second sensing module 402 can be disposed between the adjacent channel C1 and the adjacent outer channel C2. As shown in right side of FIG. 15, the distance d21 from the insertion axis AX1 to the channel C1 is less than the distance d22 from the insertion axis AX1 to the outer lateral surface 23. Therefore, when the second sensing module 402 is disposed in the hole 26, the measuring sensitivity of the second sensing module 402 can be enhanced. In other words, as shown in left side of FIG. 15, when the distance d23 from the lateral surface 415 of the second sensing module 402 to the channel C1 is less than the distance d24 from the lateral surface 415 of the second sensing module 402 to the outer lateral surface 23, the second sensing module 402 has the better measuring sensitivity. Furthermore, the direction A of the deformation of the elastic members 414 of the second sensing module 402 is perpendicular to the insertion axis AX1 of the hole 26. Therefore, the measuring sensitivity of the second sensing module 402 can be suitably adjusted according to the amount of the preload of the linear guideway 1.

Figure 16:
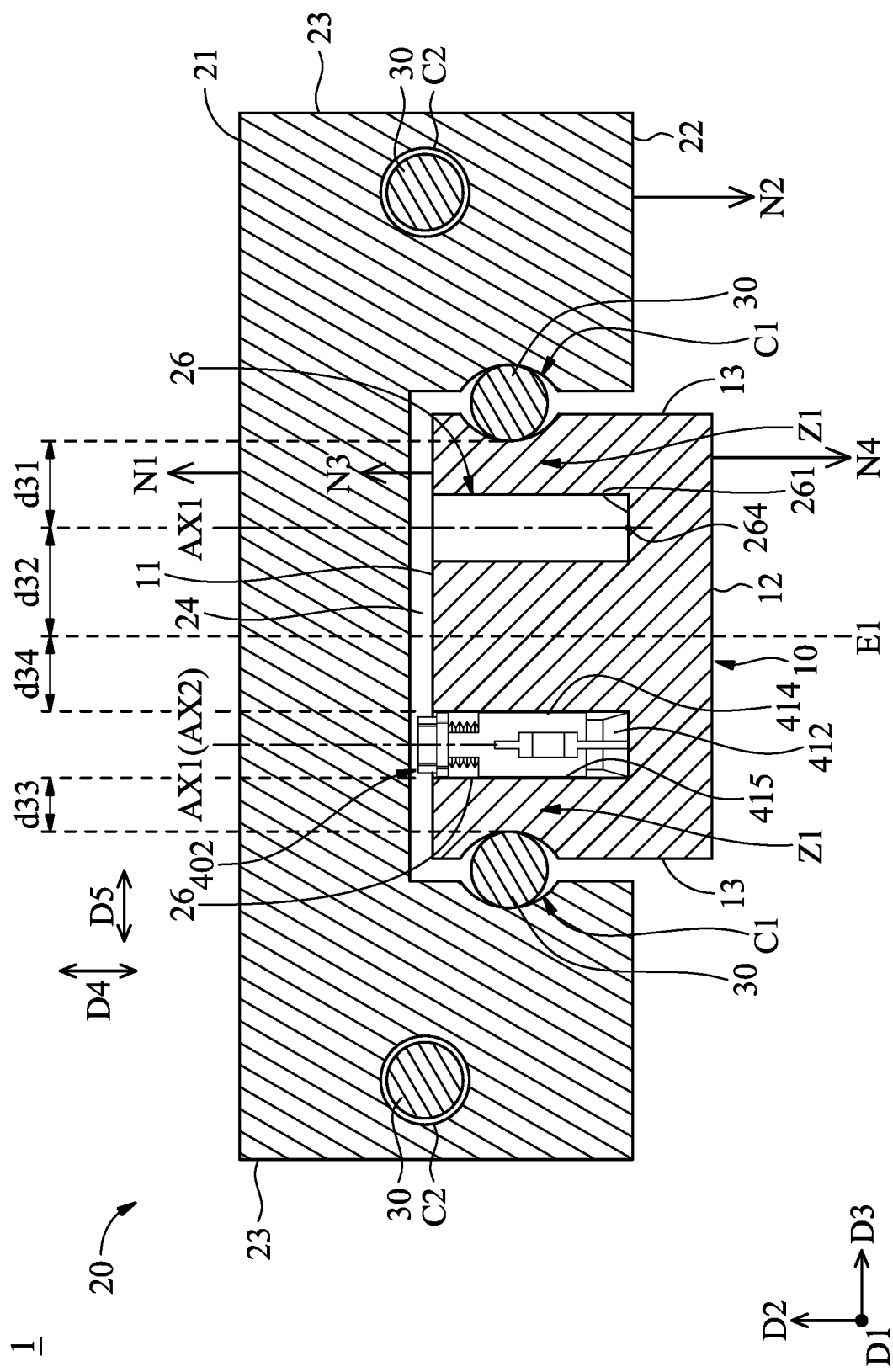
FIG. 16 is a cross-sectional view of a linear guideway according to some embodiments of the disclosure.

FIG. 16 is a cross-sectional view of a linear guideway 1 according to some embodiments of the disclosure. The difference between this embodiment and the aforementioned embodiments is in that: the hole 26 is formed on the track 10, and the second sensing module 402 is disposed in the hole 26 of the track 10 to measure the preload of the rolling members 30 applied on the track 10. In other words, in the disclosure, the sensing module can be selectively disposed in the hole 26 of the track 10 or the hole 26 of the slider 20 according to the different using state, and the convenience in the replacement of sensing module can be increased.

Figure 16A:
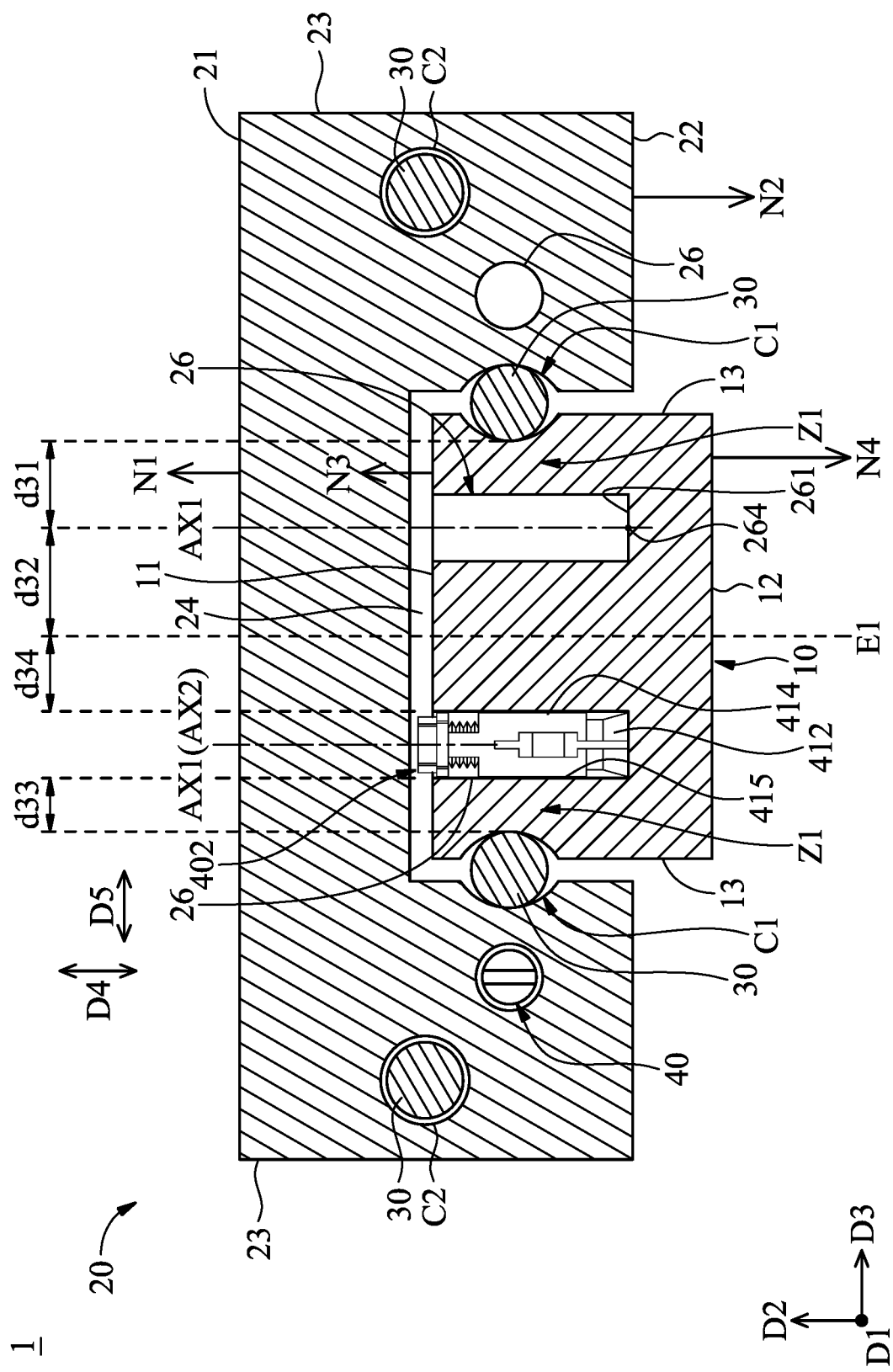
FIG. 16A is a cross-sectional view of a linear guideway according to some embodiments of the disclosure.

In some embodiments (FIG. 16A), a plurality of sensing modules can simultaneously be disposed on the hole 26 of the track 10 and the hole 26 of the slider 20, so as to determine whether the measured preload is wrong or not. For example, one sensing module 40 is disposed in the hole 26 of the slider 20 to detect one deforming region of the slider 20, and an additional sensing module 40 is disposed in the hole of the track 10 to detect another deforming region of the track 10. The sensing module 40 on the slider 20 is electrically connected to the additional sensing module 40 on the track 10, so as to transmit the strain sensing signal and the temperature sensing signal therebetween. The correctness of the measured preload can be determined according to the difference of strains between the measured amount of the deformation of the sensing module 40 on the slider 20 and the measured amount of the deformation of the additional sensing module 40 on the track 10. More in detail, when the difference exceeds a predetermined value, the user can determine that the measured preload is wrong. When the fault state is happened, a maintain process can be immediately preceded, such as replacing the sensing module.

In an embodiment, the sensing module 40 on the slider 20 includes an ASIC chip to calculate the difference of strains. In another embodiment, the sensing module 40 on the track 10 includes an ASIC chip to calculate the difference of strains. In some embodiments, the sensing module 40 on the slider 20 includes an ASIC chip and the additional sensing module 40 on the track 10 includes an additional ASIC chip.

Referring to FIG. 16, in this embodiment, the hole 26 can be formed in the track 10, and it can be extended into the track 10 along the insertion axis AX1 via the surface of the track 10 (such as the upper surface 11, the lower surface 12, or the outer lateral surface 13). In this embodiment, the hole 26 extends into the track 10 along the insertion axis AX1 via the upper surface 11 of the track 10. The insertion axis AX1 is perpendicular to the first direction D1 and parallel with the normal direction N3 of the upper surface 11.

In this embodiment, the track 10 includes two holes 26 and at least one deforming region Z1 dispose between the channel C1 and holes 26. In some embodiments, the track includes one hole 26 or more than two holes 26. The numbers of the holes 26 can be corresponded to the numbers of the sensing modules 40. In this embodiment, the weight of the slider 20 and the weight of its loading object are applied on the rolling members 30 in the channel C1. Therefore, the rolling members 30 apply the reaction force on the track 10, and the deforming region Z1 of the track 10 deforms. Moreover, the rolling members 30 also apply the reaction force on the track 10 due to the preload on the rolling members 30, so that the deforming region Z1 of the track 10 may further deform.

The second sensing module 402 in FIG. 5C can be disposed in the hole 26 and contact the deforming region Z1 of the track 10, so as to detect the deforming region Z1 by the second sensing module 402 and generate a sensing signal. In this embodiment, the second sensing module 402 is configured to detect the amount of deformation and the temperature of the deforming region Z1 of the track 10. In this embodiment, the linear guideway 1 has two second sensing modules 402. In some embodiments, the linear guideway 1 has one second sensing module 402 or more than two second sensing modules 402.

The elastic members 414 of the second sensing module 402 can contact the deforming region Z1 of the track 10. When the track 10 deforms and creates a component force applied on the second sensing module 402 along the transverse direction D5, the elastic members 414 compress the strain sensor 42" along the transverse direction D5. Therefore, the strain sensor 42" can obtain the component force along the transverse direction D5 by detecting the amount of deformation of the elastic members 414.

Moreover, the fixed portion 413 of the second sensing module 402 is configured to install the second sensing module 420 in the hole 26 of the track 10. The temperature sensor (not shown) of the second sensing module 402 can obtain the temperature of the deforming region Z1 of the track 10 by detecting the temperature of the elastic members 414.

In this embodiment, the rolling members 30 which is preloaded apply the reaction force on the track 10, and the track 10 has the amount of deformation. When the rolling members 30 have a different degree of wear, the deforming region Z1 of the track 10 has different amounts of deformation due to the rolling members 30. Therefore, the user can determine whether the rolling members 30 are worn according to the amount of deformation of the deforming region Z1 of the track 10. Furthermore, the user can also correct the amount of deformation according to the temperature measured by the temperature sensor, so as to obtain the exact degree of wear of the rolling members 30.

As shown in FIG. 16, the track 10 can be divided into two parts by a central cross-section E1 in the first direction D1. In this embodiment, the normal direction of the central cross-section E1 is parallel with the third direction D3, and the central cross-section E1 extends along the first direction D1. Moreover, the central cross-section E1 is disposed between two outer lateral surfaces 13 and parallel with the outer lateral surfaces 13. The second sensing module 402 and the hole 26 can be disposed between the central cross-section E1 and one of the outer lateral surfaces 13, or disposed between the central cross-section E1 and the channel C1.

As shown in right side of FIG. 16, the distance d31 from the insertion axis AX1 to the adjacent channel C1 is less than the distance d32 from the insertion axis AX1 to the central cross-section E1. Therefore, when the second sensing module 402 is disposed in the hole 26, the measuring sensitivity of the second sensing module 402 can be enhanced. In other words, when the distance d33 from the lateral surface 415 of the second sensing module 402 to the adjacent channel C1 is less than the distance d34 from the lateral surface 415 of the second sensing module 402 to the central cross-section E1, the measuring sensitivity of the second sensing module 402 can be enhanced. Furthermore, the direction of the deformation of the elastic members 414 of the second sensing module 402 (the transverse direction D5) is perpendicular to the insertion axis AX1 of the hole 26. Therefore, the sensitivity of the second sensing module 402 can be adjusted by adjusting the lengths of the elastic members 414 of the second sensing module 402 along the longitudinal direction D4.

In some embodiments (not shown), the hole 26 is formed from the lower surface 12 of the track 10, and extends into the track 10 along another insertion axis, which is parallel with the second direction D2. Therefore, the second sensing module 402 can be disposed in the hole 26 via the lower surface 12 of the track 10.

In some embodiments (not shown), the hole 26 is formed from the outer lateral surface 13 of the track 10 and extends along another insertion axis which is parallel with the third direction D3. Therefore, the second sensing module 402 can be disposed in the hole 26 via the outer lateral surface 13 of the track 10.

In some embodiments, the linear guideway 1 can include one second sensing module 402 and one hole 26. The hole 26 is formed in the track 10 and it extends from the upper surface 11 along another insertion axis, which is parallel with the second direction D2, and extends into the track 10. The second sensing module 402 is disposed in the hole 26 via the upper surface 11 of the track 10. Moreover, the distance between the insertion axis AX1 of the hole 26 and one of the two channels C1 is substantially the same as the distance between the insertion axis AX1 of the hole 26 and the other channel C1. The distance between the insertion axis AX1 of the hole 26 and one of the two outer lateral surfaces 13 of the track 10 is substantially the same as the distance between the insertion axis AX1 of the hole 26 and the other one of the two outer lateral surfaces 13 of the track 10. After the second sensing module 402 is disposed in the hole 26, the distance between one of the two lateral surfaces 415 of the second sensing module 402 and the channel C1 corresponding to this lateral surface 415 is substantially the same as the distance between the other one of the two lateral surfaces 415 of the second sensing module 402 and the other channel C1 corresponding to this lateral surface 415. The distance between one of the two lateral surfaces 415 of the second sensing module 402 and one of the two outer lateral surfaces 13 of the track 10 is substantially the same as the distance between the other one of the two lateral surfaces 415 of the second sensing module 402 and the other one of the two outer lateral surfaces 13 of the track 10. In other words, the distance from the centroid 264 of the inner bottom surface 261 at the end of the hole 26 to one of the outer lateral surfaces 13 of the track 10 is substantially the same as the distance from centroid 264 of the inner bottom surface 261 at the end of the hole 26 to the other one of the outer lateral surfaces 13 of the track 10.

Figure 17:
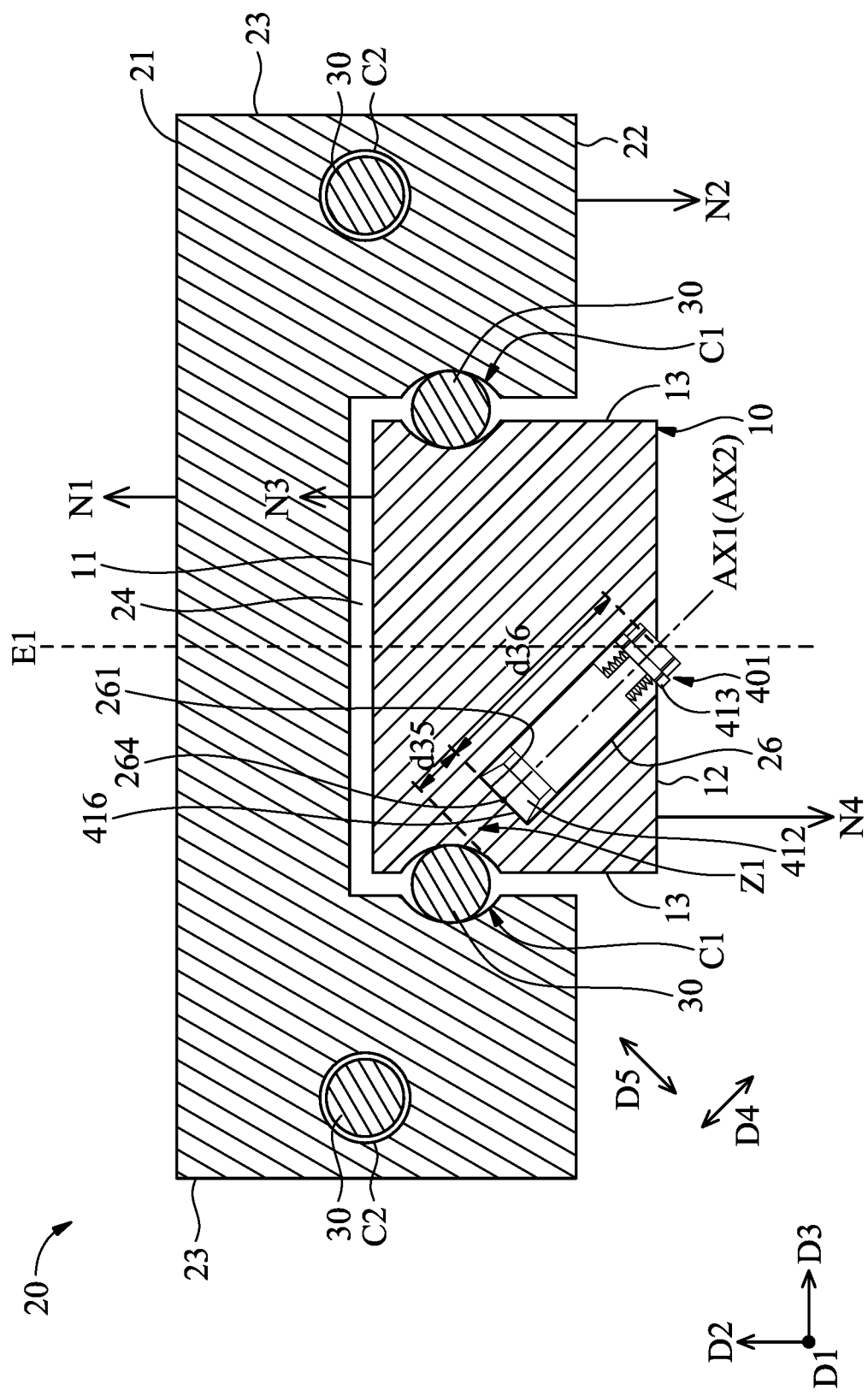
FIG. 17 is a cross-sectional view of a linear guideway according to some embodiments of the disclosure.

FIG. 17 is a cross-sectional view of a linear guideway 1 according to some embodiments of the disclosure. In this embodiment, the first sensing module 401 in FIG. 5A can be disposed in the hole 26. The structure of the linear guideway 1 in the embodiment of FIG. 17 is similar to the structure of the linear guideway 1 in the embodiment of FIG. 16.

In FIG. 17, the hole 26 is formed in the track 10 and extends from the lower surface 12 along the insertion axis AX1 and into the track 10. The first sensing module 401 is disposed in the hole 26 via the lower surface 12 with an inclined angle. In this embodiment, the insertion axis AX1 is perpendicular to the first direction D1 and passes through the lower surface 12 with the inclined angle. In other words, the insertion axis AX1 is not parallel with the normal direction N4 of the lower surface 12, and an angle is formed between the insertion axis AX1 and the second direction D2 or between the insertion axis AX1 and the third direction D3. The insertion axis AX1 coincides with or is parallel with the central axis AX2 of the first sensing module 401. The extensions of the insertion axis AX1 and the central axis AX2 pass through the channel C1.

As shown in FIG. 17, the track 10 further includes an inner bottom surface 261 at one end of the hole 26, and the distance d35 from the centroid 264 of the inner bottom surface 261 at the end of the hole 26 in the track 10 to the channel C1 is less than the distance d36 from the centroid 264 of the inner bottom surface 261 to the lower surface 12 along the longitudinal direction D4. Therefore, when the first sensing module 401 is disposed in the hole 26, the measuring sensitivity of the first sensing module 401 can be enhanced. In other words, when the distance d35 from the center of the bottom surface 416 of the contacting portion 412 of the first sensing module 401 to the channel C1 is less than the distance d36 from the center of the bottom surface 416 of the contacting portion 412 of the first sensing module 401 to the lower surface 12 along the longitudinal direction D4, the first sensing module 401 has the better measuring sensitivity. Furthermore, the direction of the deformation of the elastic member 422 of the first sensing module 401 (the longitudinal direction D4) is parallel with the insertion axis AX1 of the hole 26. Therefore, the measuring range of the first sensing module 401 can be adjusted according to the different states.

Figure 18:
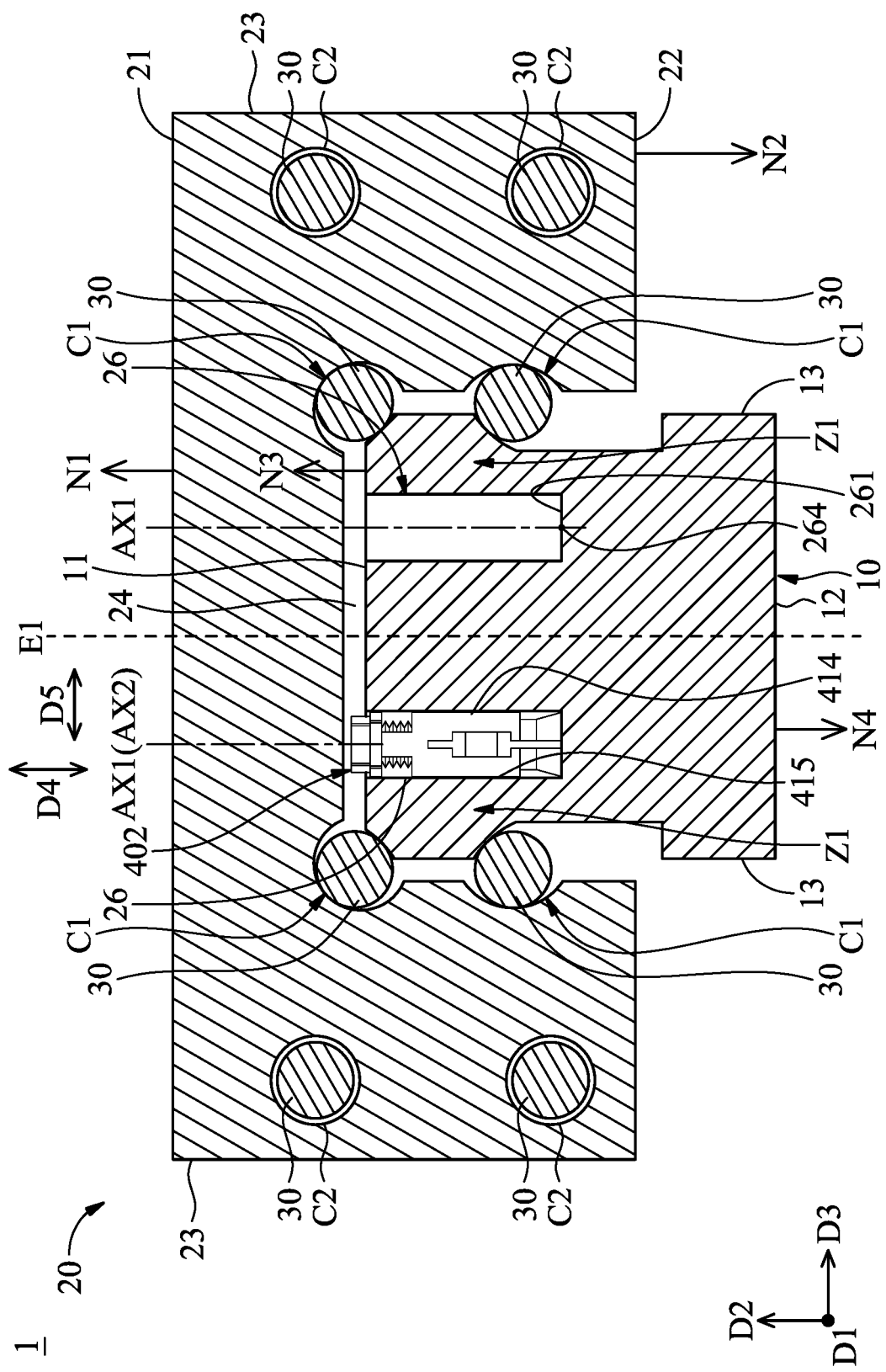
FIG. 18 is a cross-sectional view of a linear guideway according to some embodiments of the disclosure.

FIG. 18 is a cross-sectional view of a linear guideway 1 according to some embodiments of the disclosure. In this embodiment, the second sensing module 402 in FIG. 5C and the third sensing module 403 in FIG. 5E can be selectively disposed in the hole 26. Moreover, in the interest of brevity, FIG. 18 offers the second sensing module 402 as an example, one second sensing module 402 is illustrated, and the second sensing module 402 in the right hole 26 is omitted.

In this embodiment, the linear guideway 1 has four channels C1 formed between the track 10 and the slider 20. Four channels C1 extend in the direction parallel with the first direction D1. The slider 20 has four outer channels C2. Each of the outer channels C2 is connected to one of the channels C1. The rolling members 30 are disposed in the channels C1 and the outer channels C2. In some embodiments, the linear guideway 1 does not include the outer channel C2, and the rolling members 30 are rollers disposed in the channels C1.

In this embodiment, the hole 26 is formed in the track 10 and extends from the upper surface 11 of the track 10 along the insertion axis AX1 and into the track 10. The second sensing module 402 can be installed in the hole 26 via the upper surface 11 of the track 10.

In some embodiments, the hole 26 is formed on the lower surface 12 of the track 10, and extends from the lower surface 12 along an insertion axis parallel with the second direction D2 into the track 10. The second sensing module 402 can be installed in the hole 26 via the lower surface 12.

In some embodiments, the hole 26 is formed in the track and extends from the outer lateral surface 13 along an insertion axis, which is parallel with the third direction D3, and into the track 10. The second sensing module 402 can be installed in the hole 26 via the outer lateral surface 13. The second sensing module 402 and the hole 26 can be disposed between two adjacent channels C1.

In some embodiments, the linear guideway 1 includes one second sensing module 40 and one hole 26 disposed in the track 10. The insertion axis of the hole 26 is parallel with the second direction D2, and the distance between the insertion axis and one of the two channels C1 is substantially the same as the distance between the insertion axis and the other one of the two channels. The distance between the insertion axis of the hole 26 and one of the two outer lateral surface 13 of the track 10 is substantially the same as the distance between the insertion axis of the hole 26 and the other one of the two outer lateral surface 13 of the track 10. Furthermore, the second sensing module 402 is disposed in the hole 26 of the track 10. The distance between one of the two lateral surfaces 415 of the second sensing module 402 and the channel C1 corresponding to this lateral surface 415 is substantially the same as the distance between the other one of the two lateral surfaces 415 of the second sensing module 402 and the other channel C1 corresponding to this lateral surface 415. The distance between one of the two lateral surfaces 415 of the second sensing module 402 and one of the two outer lateral surfaces 13 of the track 10 is substantially the same as the distance between the other one of the two lateral surfaces 415 of the second sensing module 402 and the other one of the two outer lateral surfaces 13 of the track 10.

The disclosed features may be combined, modified, or replaced in any suitable manner in one or more disclosed embodiments, but are not limited to any particular embodiments. The embodiments of the present disclosure offer advantages over existing art, though it is understood that other embodiments may offer different advantages, not all advantages are necessarily discussed herein, and that no particular advantage is required for all embodiments. Various advantages may present in some embodiments.

In summary, a linear guideway with an embedded sensor is provided. The linear guideway can use the sensing module embedded in the slider or the track to detect the amount of deformation of the slider or the track, so as to obtain the wear rate of the rolling members (the balls or the rollers). The linear guideway with the embedded sensor can further use the sensing module to detect the temperature of the slider or the track to correct the amount of deformation, and exactly calculate the wear rate of the balls or the rollers. Therefore, the user can replace the worn balls immediately according to the wear state of the balls, and the slider can smoothly and accurately move on the track.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

What is claimed is:

1. A linear guideway with an embedded sensor, comprising:

a track, extending in a first direction and comprising:
  at least one first recess;
a slider, wherein the slider can move in the first direction and comprises:
  at least one second recess;
a channel, formed by coupling the at least one first recess and the at least one second recess, and extending in the first direction;
at least one hole, extending from a surface of the slider along an insertion axis into the slider;
at least one deforming region, disposed between the at least one hole and the channel;
a plurality of rolling members, disposed in the channel; and
at least one sensing module, disposed in the at least one hole, wherein the at least one sensing module contacts the at least one deforming region to detect an amount of deformation of the at least one deforming region.

2. The linear guideway with the embedded sensor as claimed in claim 1, wherein the insertion axis corresponding to the at least one hole is perpendicular to the first direction.

3. The linear guideway with the embedded sensor as claimed in claim 2, wherein the surface from which the at least one hole extends is an upper surface, a lower surface, or an outer lateral surface of the slider.

4. The linear guideway with the embedded sensor as claimed in claim 2, wherein the distance from the insertion axis to the channel is less than the distance from the insertion axis to an outer lateral surface of the slider.

5. The linear guideway with the embedded sensor as claimed in claim 4, wherein the at least one sensing module comprises an elastic member, wherein the elastic member becomes deformed when a force is applied to the elastic member, and a deforming direction of the elastic member is perpendicular to the insertion axis of the at least one hole.

6. The linear guideway with the embedded sensor as claimed in claim 2, wherein the slider further comprises at least one inner bottom surface at one end of the at least one hole, the at least one inner bottom surface of the slider has a centroid, and the distance from the centroid to the channel is less than the distance from the centroid to the surface.

7. The linear guideway with the embedded sensor as claimed in claim 6, wherein the at least one sensing module comprises an elastic member, wherein the elastic member becomes deformed when a force is applied to the elastic member, and a deforming direction of the elastic member is parallel with the insertion axis of the at least one hole.

8. The linear guideway with the embedded sensor as claimed in claim 1, wherein the insertion axis of the at least one hole is parallel with the first direction.

9. The linear guideway with an embedded sensor as claimed in claim 8, wherein the surface from which the at least one hole extends is a cross-section of the slider.

10. The linear guideway with the embedded sensor as claimed in claim 8, wherein the distance from the insertion axis to the channel is less than the distance from the insertion axis to an outer lateral surface of the slider.

11. The linear guideway with the embedded sensor as claimed in claim 10, wherein the at least one sensing module comprises an elastic member, wherein the elastic member becomes deformed when a force is applied to the elastic member, and a deforming direction of the elastic member is parallel with the insertion axis of the at least one hole.

12. The linear guideway with the embedded sensor as claimed in claim 1, wherein the at least one sensing module further comprises a temperature sensor, a strain sensor, and an application-specific integrated circuit chip (ASIC chip), and the temperature sensor and the strain sensor are electrically connected to the application-specific integrated circuit chip.

13. The linear guideway with the embedded sensor as claimed in claim 1, wherein the track comprises an additional hole and an additional deforming region, and the linear guideway further comprises an additional sensing module, wherein the additional sensing module is disposed in the additional hole to detect an amount of deformation of the additional deforming region, and the at least one sensing module disposed on the slider is electrically connected to the additional sensing module disposed on the track.

14. The linear guideway with the embedded sensor as claimed in claim 13, wherein the additional sensing module further comprises an additional application-specific integrated circuit chip (ASIC chip) to calculate the difference between the amount of deformation and the additional amount of deformation.

15. The linear guideway with the embedded sensor as claimed in claim 1, wherein the at least one sensing module comprises a first elastic member and a second elastic member, a deforming direction of the first elastic member is parallel with the insertion axis of the at least one hole, and a deforming direction of the second elastic member is perpendicular to the insertion axis of the at least one hole.

16. A linear guideway with an embedded sensor, comprising:
a track, extending in a first direction and comprising:
  at least one first recess;
  at least one hole, extending from a surface of the track along an insertion axis into the track; and
  at least one deforming region;
a slider, wherein the slider can move in the first direction and comprises:
  at least one second recess; and
a channel, formed by coupling the at least one first recess and the at least one second recess, and extending in the first direction, wherein the at least one deforming region is disposed between the at least one hole and the channel;
a plurality of rolling members, disposed in the channel; and
at least one sensing module, disposed in the at least one hole, wherein the at least one sensing module contacts the at least one deforming region to detect the amount of deformation of the at least one deforming region.

17. The linear guideway with the embedded sensor as claimed in claim 16, wherein the insertion axis corresponding to the at least one hole is perpendicular to the first direction.

18. The linear guideway with the embedded sensor as claimed in claim 17, wherein the surface from which the at least one hole extends is an upper surface, a lower surface, or an outer lateral surface of the track.

19. The linear guideway with the embedded sensor as claimed in claim 17, wherein the track has a central cross-section extending in the first direction, the track can be equally divided into two parts by the central cross-section, and the distance from the insertion axis to the channel is less than the distance from the insertion axis to the central cross-section.

20. The linear guideway with the embedded sensor as claimed in claim 19, wherein the at least one sensing module comprises an elastic member, wherein the elastic member becomes deformed when a force is applied to the elastic member, and a deforming direction of the elastic member is perpendicular to the insertion axis of the at least one hole.

21. The linear guideway with the embedded sensor as claimed in claim 17, wherein the surface from which the at least one hole extends is a lower surface of the track, the track further comprises at least one inner bottom surface at one end of the at least one hole, the at least one inner bottom surface of the track has a centroid, and the distance from the centroid to the channel is less than the distance from the centroid to the lower surface.

22. The linear guideway with the embedded sensor as claimed in claim 21, wherein the at least one sensing module comprises an elastic member, wherein the elastic member becomes deformed when a force is applied to the elastic member, and a deforming direction of the elastic member is parallel with the insertion axis of the at least one hole.

23. The linear guideway with the embedded sensor as claimed in claim 17, wherein the surface from which the at least one hole extends is an outer lateral surface of the track, the track further comprises at least one inner bottom surface at one end of the at least one hole, the at least one inner bottom surface of the track has a centroid, and the distance from the centroid to the outer lateral surface is substantially the same as the distance from the centroid to the other outer lateral surface of the track.

24. The linear guideway with the embedded sensor as claimed in claim 23, wherein the at least one sensing module comprises an elastic member, wherein the elastic member becomes deformed when a force is applied to the elastic member, and a deforming direction of the elastic member is perpendicular to the insertion axis.

25. The linear guideway with the embedded sensor as claimed in claim 23, wherein the at least one sensing module comprises an elastic member, wherein the elastic member becomes deformed when a force is applied to the elastic member, and a deforming direction of the elastic member is parallel with the insertion axis.

26. The linear guideway with the embedded sensor as claimed in claim 16, wherein the at least one sensing module further comprises a temperature sensor, a strain sensor, and an application-specific integrated circuit chip (ASIC chip), and the temperature sensor and the strain sensor are electrically connected to the application-specific integrated circuit chip.

27. The linear guideway with the embedded sensor as claimed in claim 16, wherein the at least one sensing module comprises a first elastic member and a second elastic member, a deforming direction of the first elastic member is parallel with the insertion axis of the at least one hole, and a deforming direction of the second elastic member is perpendicular to the insertion axis of the at least one hole.

* * * * *